US009098739B2

(12) United States Patent
Dal Mutto et al.

(10) Patent No.: US 9,098,739 B2
(45) Date of Patent: *Aug. 4, 2015

(54) SYSTEMS AND METHODS FOR TRACKING HUMAN HANDS USING PARTS BASED TEMPLATE MATCHING

(71) Applicant: Aquifi, Inc., Palo Alto, CA (US)

(72) Inventors: Carlo Dal Mutto, Sunnyvale, CA (US); Britta Hummel, Berkeley, CA (US); Michele Stoppa, Mountain View, CA (US); Giuliano Pasqualotto, Mountain View, CA (US); Teresa Mao, Morgan Hill, CA (US); Giridhar Murali, Sunnyvale, CA (US)

(73) Assignee: Aquifi, Inc., Palo Alto, CA (US)

( * ) Notice: Subject to any disclaimer, the term of this patent is extended or adjusted under 35 U.S.C. 154(b) by 95 days.

This patent is subject to a terminal disclaimer.

(21) Appl. No.: 13/899,520

(22) Filed: May 21, 2013

(65) Prior Publication Data

US 2013/0343605 A1    Dec. 26, 2013

Related U.S. Application Data

(60) Provisional application No. 61/690,283, filed on Jun. 25, 2012, provisional application No. 61/796,359, filed on Nov. 8, 2012, provisional application No. 61/776,719, filed on Mar. 11, 2013.

(51) Int. Cl.
*G06K 9/00* (2006.01)
*G06F 21/32* (2013.01)

(52) U.S. Cl.
CPC ........ *G06K 9/00355* (2013.01); *G06K 9/00375* (2013.01); *G06F 21/32* (2013.01)

(58) Field of Classification Search
None
See application file for complete search history.

(56) References Cited

U.S. PATENT DOCUMENTS 5,454,043 A * 9/1995 Freeman ............... 382/168
5,852,672 A   12/1998 Lu
(Continued)

FOREIGN PATENT DOCUMENTS

WO      9749262 A1   12/1997
WO   2005/091125 A2   9/2005
(Continued)

OTHER PUBLICATIONS

Arasanathan Thayananthan (Template-based Pose Estimation and Tracking of 3D Hand Motion, Cambridge, UK: Department of Engineering, University of Cambridge (2005)).*

(Continued)

*Primary Examiner* — Amara Abdi
(74) *Attorney, Agent, or Firm* — Christie, Parker & Hale LLP

(57) ABSTRACT

Systems and methods for tracking human hands using parts based template matching are described. One embodiment of the invention includes a processor, a reference camera and memory containing: a hand tracking application; and a finger template including an edge features template. In addition, the hand tracking application configures the processor to: detect at least one candidate finger in a frame of video data received from the reference camera, where each candidate finger is a grouping of pixels identified by searching the frame of video data for a grouping of pixels that have image gradient orientations that match the edge features of the finger template accounting for rotation and scaling differences; and verify the correct detection of a candidate finger by confirming that the colors of the pixels within the grouping of pixels identified as a candidate finger satisfy a skin color criterion.

36 Claims, 14 Drawing Sheets

(56) References Cited

U.S. PATENT DOCUMENTS

| | | | |
|---|---|---|---|
| 6,191,773 | B1 | 2/2001 | Maruno et al. |
| 6,323,942 | B1 | 11/2001 | Bamji |
| 6,512,838 | B1 | 1/2003 | Rafii et al. |
| 6,515,740 | B2 | 2/2003 | Bamji et al. |
| 6,522,395 | B1 | 2/2003 | Bamji et al. |
| 6,580,496 | B2 | 6/2003 | Bamji et al. |
| 6,587,186 | B2 | 7/2003 | Bamji et al. |
| 6,614,422 | B1 | 9/2003 | Rafii et al. |
| 6,674,895 | B2 | 1/2004 | Rafii et al. |
| 6,678,039 | B2 | 1/2004 | Charbon |
| 6,690,354 | B2 | 2/2004 | Sze |
| 6,690,618 | B2 | 2/2004 | Tomasi et al. |
| 6,710,770 | B2 | 3/2004 | Tomasi et al. |
| 6,834,120 | B1 | 12/2004 | LeClerc et al. |
| 6,876,775 | B2 | 4/2005 | Torunoglu |
| 6,906,793 | B2 | 6/2005 | Bamji et al. |
| 6,919,549 | B2 | 7/2005 | Bamji et al. |
| 6,944,315 | B1 | 9/2005 | Zipperer et al. |
| 7,006,236 | B2 | 2/2006 | Tomasi et al. |
| 7,038,659 | B2 | 5/2006 | Rajkowski |
| 7,050,177 | B2 | 5/2006 | Tomasi et al. |
| 7,151,530 | B2 | 12/2006 | Roeber et al. |
| 7,157,685 | B2 | 1/2007 | Bamji et al. |
| 7,173,230 | B2 | 2/2007 | Charbon |
| 7,176,438 | B2 | 2/2007 | Bamji et al. |
| 7,203,356 | B2 | 4/2007 | Gokturk et al. |
| 7,212,663 | B2 | 5/2007 | Tomasi |
| 7,283,213 | B2 | 10/2007 | O'Connor et al. |
| 7,310,431 | B2 | 12/2007 | Gokturk et al. |
| 7,321,111 | B2 | 1/2008 | Bamji et al. |
| 7,340,077 | B2 | 3/2008 | Gokturk et al. |
| 7,352,454 | B2 | 4/2008 | Bamji et al. |
| 7,375,803 | B1 | 5/2008 | Bamji |
| 7,379,100 | B2 | 5/2008 | Gokturk et al. |
| 7,379,163 | B2 | 5/2008 | Rafii et al. |
| 7,405,812 | B1 | 7/2008 | Bamji |
| 7,408,627 | B2 | 8/2008 | Bamji et al. |
| 7,433,029 | B1 | 10/2008 | Hsu |
| 7,450,220 | B2 | 11/2008 | O'Connor et al. |
| 7,464,351 | B2 | 12/2008 | Bamji et al. |
| 7,471,376 | B2 | 12/2008 | Bamji et al. |
| 7,507,947 | B2 | 3/2009 | Bamji et al. |
| 7,511,801 | B1 | 3/2009 | Rafii et al. |
| 7,526,120 | B2 | 4/2009 | Gokturk et al. |
| 7,636,150 | B1 | 12/2009 | McCauley et al. |
| 7,653,833 | B1 | 1/2010 | Miller et al. |
| 7,653,883 | B2 | 1/2010 | Hotelling et al. |
| 7,665,041 | B2 | 2/2010 | Wilson et al. |
| 7,719,662 | B2 | 5/2010 | Bamji et al. |
| 7,741,961 | B1 | 6/2010 | Rafii et al. |
| 7,791,715 | B1 | 9/2010 | Bamji |
| 7,805,003 | B1* | 9/2010 | Cohen et al. ............ 382/173 |
| 7,877,707 | B2 | 1/2011 | Westerman et al. |
| 7,936,449 | B1 | 5/2011 | Bamji et al. |
| 7,994,465 | B1 | 8/2011 | Bamji et al. |
| 8,009,871 | B2 | 8/2011 | Rafii et al. |
| D645,493 | S | 9/2011 | Zhao |
| 8,086,971 | B2 | 12/2011 | Radivojevic et al. |
| 8,134,637 | B2 | 3/2012 | Rossbach et al. |
| 8,139,141 | B2 | 3/2012 | Bamji et al. |
| 8,139,142 | B2 | 3/2012 | Bamji et al. |
| 8,179,604 | B1 | 5/2012 | Prada Gomez et al. |
| 8,180,114 | B2 | 5/2012 | Nishihara et al. |
| 8,187,097 | B1 | 5/2012 | Zhang |
| 8,194,233 | B2 | 6/2012 | Bamji |
| 8,203,699 | B2 | 6/2012 | Bamji et al. |
| 8,212,859 | B2 | 7/2012 | Tang et al. |
| 8,232,990 | B2 | 7/2012 | King et al. |
| 8,265,350 | B2* | 9/2012 | Torii et al. ............ 382/118 |
| 8,274,535 | B2 | 9/2012 | Hildreth et al. |
| 8,314,924 | B2 | 11/2012 | Bamji et al. |
| 8,339,359 | B2 | 12/2012 | Hsieh et al. |
| 8,363,212 | B2 | 1/2013 | Bamji et al. |
| 8,368,795 | B2 | 2/2013 | Lo et al. |
| 8,462,132 | B2 | 6/2013 | Ren et al. |
| 8,525,876 | B2 | 9/2013 | Fan et al. |
| 8,539,359 | B2 | 9/2013 | Rapaport et al. |
| 8,587,773 | B2 | 11/2013 | Bamji et al. |
| 8,589,033 | B2 | 11/2013 | Rafii et al. |
| 8,602,887 | B2 | 12/2013 | Tardif et al. |
| 8,615,108 | B1 | 12/2013 | Stoppa et al. |
| 8,675,182 | B2 | 3/2014 | Bamji |
| 8,681,124 | B2 | 3/2014 | Bamji et al. |
| 8,686,943 | B1 | 4/2014 | Rafii |
| 8,693,724 | B2 | 4/2014 | Ahmed et al. |
| 8,773,512 | B1 | 7/2014 | Rafii |
| 8,787,663 | B2 | 7/2014 | Litvak et al. |
| 8,824,737 | B2 | 9/2014 | Gurman et al. |
| 8,830,312 | B2 | 9/2014 | Hummel et al. |
| 8,836,768 | B1 | 9/2014 | Rafii et al. |
| 8,840,466 | B2 | 9/2014 | Kareemi et al. |
| 8,854,433 | B1 | 10/2014 | Rafii |
| 8,934,675 | B2 | 1/2015 | Dal Mutto et al. |
| 2002/0112095 | A1 | 8/2002 | Ford et al. |
| 2002/0140633 | A1 | 10/2002 | Rafii et al. |
| 2003/0021032 | A1 | 1/2003 | Bamji et al. |
| 2003/0132921 | A1 | 7/2003 | Torunoglu et al. |
| 2003/0132950 | A1 | 7/2003 | Surucu et al. |
| 2003/0165048 | A1 | 9/2003 | Bamji et al. |
| 2003/0169906 | A1 | 9/2003 | Gokturk et al. |
| 2003/0172375 | A1 | 9/2003 | Shaw et al. |
| 2003/0174125 | A1 | 9/2003 | Torunoglu et al. |
| 2004/0046744 | A1 | 3/2004 | Rafii et al. |
| 2004/0066500 | A1 | 4/2004 | Gokturk et al. |
| 2004/0170323 | A1* | 9/2004 | Cootes et al. ............ 382/199 |
| 2005/0134853 | A1 | 6/2005 | Ingleson et al. |
| 2005/0238229 | A1 | 10/2005 | Ishidera |
| 2005/0271279 | A1 | 12/2005 | Fujimura et al. |
| 2006/0187214 | A1 | 8/2006 | Gillespie et al. |
| 2006/0197753 | A1 | 9/2006 | Hotelling |
| 2006/0241371 | A1 | 10/2006 | Rafii et al. |
| 2006/0272436 | A1 | 12/2006 | Lein et al. |
| 2007/0057946 | A1 | 3/2007 | Albeck et al. |
| 2007/0299631 | A1 | 12/2007 | Macbeth et al. |
| 2008/0059390 | A1 | 3/2008 | Cox et al. |
| 2008/0120577 | A1 | 5/2008 | Ma et al. |
| 2008/0281523 | A1 | 11/2008 | Dahl et al. |
| 2009/0021489 | A1 | 1/2009 | Westerman et al. |
| 2009/0077161 | A1 | 3/2009 | Hamilton, II et al. |
| 2009/0079813 | A1 | 3/2009 | Hildreth |
| 2009/0103780 | A1 | 4/2009 | Nishihara et al. |
| 2009/0110301 | A1 | 4/2009 | Schopp et al. |
| 2009/0153671 | A1 | 6/2009 | Lee et al. |
| 2009/0183125 | A1 | 7/2009 | Magal et al. |
| 2009/0228841 | A1 | 9/2009 | Hildreth |
| 2009/0290811 | A1 | 11/2009 | Imai |
| 2009/0307658 | A1 | 12/2009 | Freitas et al. |
| 2010/0027845 | A1 | 2/2010 | Kim et al. |
| 2010/0027846 | A1 | 2/2010 | Xu et al. |
| 2010/0027892 | A1 | 2/2010 | Guan et al. |
| 2010/0053151 | A1 | 3/2010 | Marti et al. |
| 2010/0110384 | A1 | 5/2010 | Maekawa |
| 2010/0124949 | A1 | 5/2010 | Demuynck et al. |
| 2010/0156676 | A1 | 6/2010 | Mooring et al. |
| 2010/0192109 | A1 | 7/2010 | Westerman et al. |
| 2010/0199228 | A1 | 8/2010 | Latta et al. |
| 2010/0202663 | A1 | 8/2010 | Kim et al. |
| 2010/0208038 | A1 | 8/2010 | Kutliroff et al. |
| 2010/0211920 | A1 | 8/2010 | Westerman et al. |
| 2010/0229125 | A1 | 9/2010 | Cha |
| 2010/0235786 | A1 | 9/2010 | Maizels et al. |
| 2010/0265316 | A1 | 10/2010 | Sali et al. |
| 2010/0271511 | A1 | 10/2010 | Ma et al. |
| 2010/0284082 | A1 | 11/2010 | Shpunt et al. |
| 2010/0296368 | A1 | 11/2010 | Dahl et al. |
| 2010/0306714 | A1 | 12/2010 | Latta et al. |
| 2010/0321389 | A1* | 12/2010 | Gay et al. ............ 345/427 |
| 2010/0329511 | A1 | 12/2010 | Yoon et al. |
| 2011/0025827 | A1 | 2/2011 | Shpunt et al. |
| 2011/0052006 | A1 | 3/2011 | Gurman et al. |
| 2011/0069389 | A1 | 3/2011 | Shpunt |
| 2011/0075259 | A1 | 3/2011 | Shpunt |
| 2011/0096954 | A1 | 4/2011 | Dahl |
| 2011/0103448 | A1 | 5/2011 | Dahl et al. |

(56) References Cited

U.S. PATENT DOCUMENTS

| | | |
|---|---|---|
| 2011/0114857 A1 | 5/2011 | Akerman et al. |
| 2011/0115892 A1 | 5/2011 | Fan et al. |
| 2011/0134036 A1 | 6/2011 | Suggs |
| 2011/0134114 A1 | 6/2011 | Rais et al. |
| 2011/0148798 A1 | 6/2011 | Dahl |
| 2011/0149044 A1* | 6/2011 | Snin ........................... 348/47 |
| 2011/0158508 A1 | 6/2011 | Shpunt et al. |
| 2011/0164032 A1 | 7/2011 | Shadmi |
| 2011/0173574 A1 | 7/2011 | Clavin et al. |
| 2011/0187878 A1 | 8/2011 | Mor et al. |
| 2011/0188054 A1 | 8/2011 | Petronius et al. |
| 2011/0193939 A1 | 8/2011 | Vassigh et al. |
| 2011/0197161 A1 | 8/2011 | Mattingly et al. |
| 2011/0205421 A1 | 8/2011 | Shpunt et al. |
| 2011/0211044 A1 | 9/2011 | Shpunt et al. |
| 2011/0211073 A1 | 9/2011 | Foster |
| 2011/0211754 A1 | 9/2011 | Litvak et al. |
| 2011/0219340 A1 | 9/2011 | Pathangay et al. |
| 2011/0221974 A1 | 9/2011 | Stern et al. |
| 2011/0222726 A1 | 9/2011 | Ruan |
| 2011/0243380 A1 | 10/2011 | Forutanpour et al. |
| 2011/0254762 A1 | 10/2011 | Dahl et al. |
| 2011/0254765 A1 | 10/2011 | Brand |
| 2011/0262006 A1 | 10/2011 | Nakano |
| 2011/0267456 A1 | 11/2011 | Adermann |
| 2011/0274357 A1 | 11/2011 | Iwamoto et al. |
| 2011/0286673 A1 | 11/2011 | Givon et al. |
| 2011/0289455 A1 | 11/2011 | Reville et al. |
| 2011/0291925 A1 | 12/2011 | Israel et al. |
| 2011/0291926 A1 | 12/2011 | Gokturk et al. |
| 2011/0291988 A1 | 12/2011 | Bamji et al. |
| 2011/0292036 A1 | 12/2011 | Sali et al. |
| 2011/0292181 A1 | 12/2011 | Acharya et al. |
| 2011/0292370 A1 | 12/2011 | Hills et al. |
| 2011/0292380 A1 | 12/2011 | Bamji |
| 2011/0293137 A1 | 12/2011 | Gurman et al. |
| 2011/0294574 A1 | 12/2011 | Yamada et al. |
| 2011/0295562 A1 | 12/2011 | Mehta et al. |
| 2011/0296353 A1 | 12/2011 | Ahmed et al. |
| 2011/0298704 A1 | 12/2011 | Krah |
| 2011/0300929 A1 | 12/2011 | Tardif et al. |
| 2011/0310010 A1 | 12/2011 | Hoffnung et al. |
| 2011/0310125 A1 | 12/2011 | McEldowney et al. |
| 2012/0011454 A1 | 1/2012 | Droz et al. |
| 2012/0027252 A1 | 2/2012 | Liu et al. |
| 2012/0038986 A1 | 2/2012 | Pesach |
| 2012/0042150 A1 | 2/2012 | Saar |
| 2012/0042246 A1 | 2/2012 | Schwesinger et al. |
| 2012/0050488 A1 | 3/2012 | Cohen et al. |
| 2012/0051605 A1 | 3/2012 | Nagar et al. |
| 2012/0070070 A1 | 3/2012 | Litvak |
| 2012/0072939 A1 | 3/2012 | Crenshaw |
| 2012/0078614 A1 | 3/2012 | Galor et al. |
| 2012/0092304 A1 | 4/2012 | Katz |
| 2012/0099403 A1 | 4/2012 | Dahl et al. |
| 2012/0106792 A1 | 5/2012 | Kang et al. |
| 2012/0124604 A1 | 5/2012 | Small et al. |
| 2012/0140094 A1 | 6/2012 | Shpunt et al. |
| 2012/0140109 A1 | 6/2012 | Shpunt et al. |
| 2012/0169583 A1 | 7/2012 | Rippel et al. |
| 2012/0169671 A1 | 7/2012 | Yasutake |
| 2012/0176414 A1 | 7/2012 | Givon |
| 2012/0182464 A1 | 7/2012 | Shpunt et al. |
| 2012/0202569 A1 | 8/2012 | Maizels et al. |
| 2012/0204133 A1 | 8/2012 | Guendelman et al. |
| 2012/0204202 A1 | 8/2012 | Rowley et al. |
| 2012/0206339 A1 | 8/2012 | Dahl |
| 2012/0218183 A1 | 8/2012 | Givon et al. |
| 2012/0223882 A1 | 9/2012 | Galor et al. |
| 2012/0243374 A1 | 9/2012 | Dahl et al. |
| 2012/0249744 A1 | 10/2012 | Pesach et al. |
| 2012/0268364 A1 | 10/2012 | Minnen |
| 2012/0270653 A1 | 10/2012 | Kareemi et al. |
| 2012/0274550 A1 | 11/2012 | Campbell et al. |
| 2012/0274610 A1 | 11/2012 | Dahl |
| 2012/0281240 A1 | 11/2012 | Cohen et al. |
| 2012/0299820 A1 | 11/2012 | Dahl |
| 2012/0304067 A1 | 11/2012 | Han et al. |
| 2012/0306876 A1* | 12/2012 | Shotton et al. ................ 345/424 |
| 2012/0309532 A1 | 12/2012 | Ambrus et al. |
| 2012/0313848 A1 | 12/2012 | Galor et al. |
| 2012/0313900 A1 | 12/2012 | Dahl |
| 2012/0327125 A1 | 12/2012 | Kutliroff et al. |
| 2013/0014052 A1 | 1/2013 | Frey et al. |
| 2013/0038601 A1 | 2/2013 | Han et al. |
| 2013/0038881 A1 | 2/2013 | Pesach et al. |
| 2013/0038941 A1 | 2/2013 | Pesach et al. |
| 2013/0044053 A1 | 2/2013 | Galor et al. |
| 2013/0050080 A1 | 2/2013 | Dahl et al. |
| 2013/0055120 A1 | 2/2013 | Galor et al. |
| 2013/0055143 A1 | 2/2013 | Martin et al. |
| 2013/0055150 A1 | 2/2013 | Galor |
| 2013/0057654 A1 | 3/2013 | Rafii et al. |
| 2013/0063487 A1 | 3/2013 | Spiegel et al. |
| 2013/0069876 A1 | 3/2013 | Cheng et al. |
| 2013/0094329 A1 | 4/2013 | Dahl et al. |
| 2013/0106692 A1 | 5/2013 | Maizels et al. |
| 2013/0107021 A1 | 5/2013 | Maizels et al. |
| 2013/0135312 A1 | 5/2013 | Yang et al. |
| 2013/0147770 A1 | 6/2013 | Dahl et al. |
| 2013/0155031 A1 | 6/2013 | Dahl et al. |
| 2013/0162527 A1 | 6/2013 | Dahl |
| 2013/0176258 A1 | 7/2013 | Dahl et al. |
| 2013/0179034 A1 | 7/2013 | Pryor |
| 2013/0194180 A1 | 8/2013 | Ahn et al. |
| 2013/0201316 A1 | 8/2013 | Binder et al. |
| 2013/0216094 A1 | 8/2013 | DeLean |
| 2013/0236089 A1 | 9/2013 | Litvak et al. |
| 2013/0335573 A1 | 12/2013 | Forutanpour at al. |
| 2014/0043598 A1 | 2/2014 | Bamji et al. |
| 2014/0119599 A1 | 5/2014 | Dal Mutto et al. |
| 2014/0173440 A1 | 6/2014 | Mutto et al. |
| 2014/0211991 A1 | 7/2014 | Stoppa et al. |
| 2014/0211992 A1 | 7/2014 | Stoppa et al. |
| 2014/0298273 A1 | 10/2014 | Blackstone et al. |
| 2015/0057082 A1 | 2/2015 | Kareemi et al. |
| 2015/0062003 A1 | 3/2015 | Rafii et al. |
| 2015/0062004 A1 | 3/2015 | Rafii |

FOREIGN PATENT DOCUMENTS

| | | |
|---|---|---|
| WO | 2006/011153 A2 | 2/2006 |
| WO | 2006/011153 A3 | 2/2006 |
| WO | 2007/052262 A2 | 5/2007 |
| WO | 2007/052262 A3 | 5/2007 |
| WO | 2008/126069 A2 | 10/2008 |
| WO | 2008/126069 A3 | 10/2008 |
| WO | 2009/128064 A2 | 10/2009 |
| WO | 2009/128064 A3 | 10/2009 |
| WO | 2009/142443 A2 | 11/2009 |
| WO | 2010/026587 A1 | 3/2010 |
| WO | 2010030296 A1 | 3/2010 |
| WO | 2010/046901 A2 | 4/2010 |
| WO | 2010/046901 A3 | 4/2010 |
| WO | 2010/086866 A1 | 8/2010 |
| WO | 2010/096279 A2 | 8/2010 |
| WO | 2010/096279 A3 | 8/2010 |
| WO | 2010/103482 A2 | 9/2010 |
| WO | 2010/103482 A3 | 9/2010 |
| WO | 2011/013079 A1 | 2/2011 |
| WO | 2011/033519 A1 | 3/2011 |
| WO | 2011/045789 A1 | 4/2011 |
| WO | 2012/011044 A1 | 1/2012 |
| WO | 2012/020380 A1 | 2/2012 |
| WO | 2012/020410 A2 | 2/2012 |
| WO | 2012/066501 A1 | 5/2012 |
| WO | 2012/081012 A1 | 6/2012 |
| WO | 2012/093394 A2 | 7/2012 |
| WO | 2012/095756 A2 | 7/2012 |
| WO | 2012/098534 A1 | 7/2012 |
| WO | 2012/107892 A2 | 8/2012 |
| WO | 2012/107892 A3 | 8/2012 |
| WO | 2012/119633 A1 | 9/2012 |
| WO | 2012/119885 A1 | 9/2012 |

(56) References Cited

FOREIGN PATENT DOCUMENTS

| WO | 2012/164562 A1 | 12/2012 |
|---|---|---|
| WO | 2013/008236 A1 | 1/2013 |
| WO | 2013/018099 A2 | 2/2013 |
| WO | 2013/021385 A2 | 2/2013 |
| WO | 2012095756 A3 | 7/2013 |
| WO | 2014120554 A2 | 8/2014 |

OTHER PUBLICATIONS

"PointGrab Announces New Hand Gesture Control Solution for the Latest Premium Samsung Smart TV Models", Yahoo! Finance, Retrieved on Apr. 4, 2013, Retrieved from http://www.finance.yahoo.com/news/pointgrab-announces-hand-gesture-control-22000959.html, 2 pgs.

Belaroussi et al., "Comparison of Different Combination Strategies for Face Localization", Proceedings of the 2006 International Conference on Image Processing, Computer Vision, & Pattern Recognition, Lase Vegas, Nevada, Jun. 26-29, 2006, pp. 383-389.

Forsyth, "Computer Vision—A Modern Approach", Recognition as Template Matching, 46 pgs, 2011.

Hasan et al., "Real Time Fingers and Palm Locating using Dynamic Circle Templates", International Journal of Computer Applications, vol. 41, No. 6, Mar. 2012, pp. 33-43.

Kerdvibulvech et al., "Markerless Guitarist Fingertip Detection Using a Bayesian Classifier and a Template Matching for Supporting Guitarists", Proc.10th Virtual Reality Int. Conf., Apr. 2008, 7 pgs.

Kolsch et al., "Flocks of Features for Tracking Articulated Objects", Retrieved from http://www.cs.ucsb.edu/~mturk/pubs/KolschBook05.pdf, pp. 1-18, Index, 2005.

Lin, John, "Visual Hand Tracking and Gesture Analysis", Dissertation, University of Illinois at Urbana-Champaign, 2004, 116 pgs.

Murase et al., "Gesture Keyboard Requiring Only One Camera", ACM UIST'11, Oct. 16-19, 2011, Santa Barbara, CA, pp. 1-2.

Nosowitz, "The Second Wave of Gesture-Controlled TVs", Popular Science, Retrieved on Apr. 4, 2013, Retrieved from: www.popsci.com/gadgets/article/2012-01/second-wave-gesture-controlled-tvs, 6 pgs.

Onishi et al., "3D Human Posture Estimation Using HOG Features of Monocular Images", Pattern Recognition, Peng-Yeng Yin (Ed.), Intech, DOI:10.5772/7541., Oct. 1, 2009, pp. 1-11.

Rautaray et al., "Vision Based Hand Gesture Recognition for Human Computer Interaction: A Survey", Artificial Intelligence Review, Springer, Nov. 6, 2012, 54 pgs.

Thayananthan, "Template-based Pose Estimation and Tracking of 3D Hand Motion", Dissertation, University of Cambridge, 2005, 172 pgs.

"0V7740 VGA product brief", OmniVision, Retrieved from: http://www.ovt.com/download_document.php?type=sensor&sensorid=83, 2 pgs, Sep. 2008.

CANESTA3D, "Canesta 3D ToF Sensor Demo for Living Room", Youtube, Oct. 28, 2010, Retrieved from: http://www.youtube.com/watch?v=TmKShSHOSYU.

CANESTA3D, "Canesta PC demo video", Youtube, Oct. 25, 2010, Retrieved from: http://www.youtube.com/watch?v=l36Aqk1A6vY.

CANESTA3D, "Canesta TV Gesture User Interface Demo", Youtube, May 29, 2009, Retrieved from: http://www.youtube.com/watch?v=uR27dPHI7dQ.

CANESTA3D, "Canesta's latest 3D Sensor—"Cobra" . . . highest res CMOS 3D depth sensor in the world", Youtube, Oct. 25, 2010, Retrieved from: http://wwww.youtube.com/watch?v=5_PVx1NbUZQ.

CANESTA3D, "Future of Remote Control", Youtube, Oct. 29, 2009, Retrieved from: http://www.youtube.com/watch?v=vnfdoDHiNil.

CANESTA3D, "Point Cloud Demo, using Canesta's 320x200 3D Tof Image Sensor", Youtube, Oct. 28, 2010, Retrieved from: http://www.youtube.com/watch?v=4x1XsJuH74c.

Carmody, Tim, "Why 'Gorilla Arm Syndrome' Rules Out Multitouch Notebook Displays", Wired, Oct. 21, 2010, Retrieved from http://www.wired.com/gadgetlab/2010/10/gorilla-arm-multitouch/, 3 pgs.

Zhang, Zhengyou, "Flexible Camera Calibration by Viewing a Plane From Unknown Orientations", Microsoft Research, Redmond, WA, 8 pgs, 1999.

International Search Report and Written Opinion for International Application PCT/US2014/012748, report completed Nov. 30, 2014, Mailed Jan. 14, 2015, 17 Pgs.

\* cited by examiner

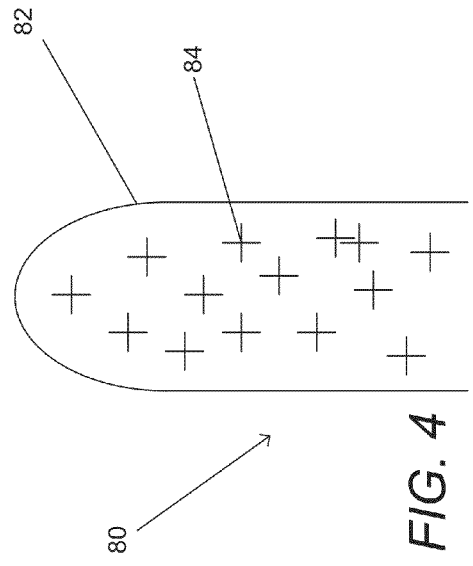
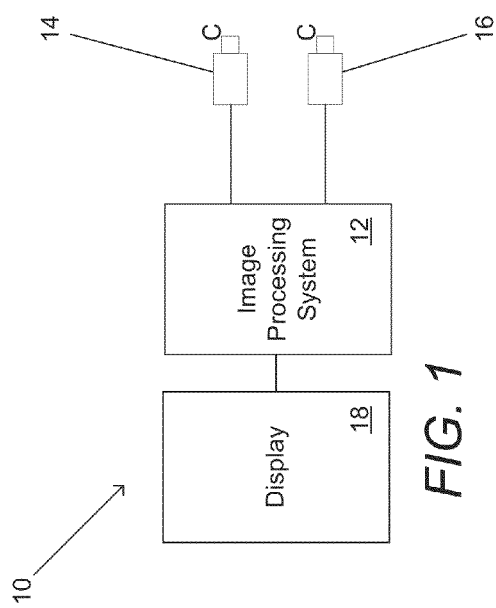
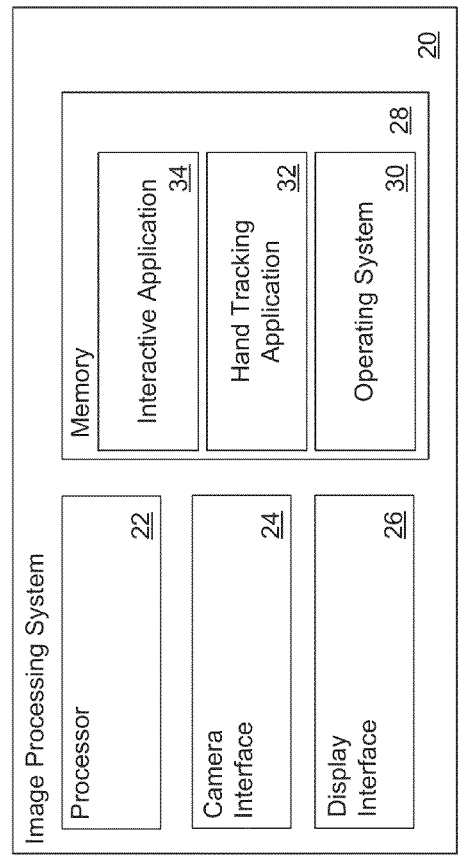
FIG. 1
FIG. 4
FIG. 2

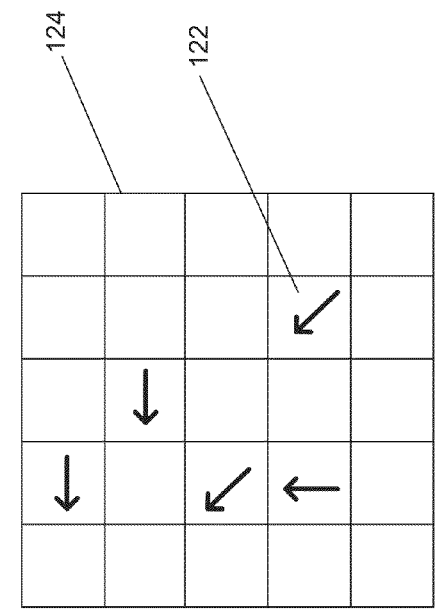
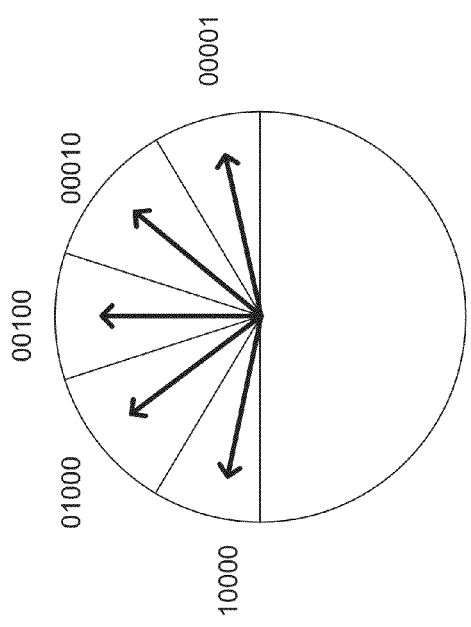
FIG. 6A
FIG. 6B
FIG. 6C
FIG. 6D

SYSTEMS AND METHODS FOR TRACKING HUMAN HANDS USING PARTS BASED TEMPLATE MATCHING

CROSS-REFERENCE TO RELATED APPLICATIONS

The current application claims priority to U.S. Provisional Patent Application Ser. No. 61/690,283, entitled "Application of Template Matching to the Detection of (Parts of) Hands in an RGB or Grayscale Image" filed Jun. 25, 2012, U.S. Provisional Patent Application Ser. No. 61/796,359, entitled "Application of Multi-View Template Matching to the Detection of (Parts of) Hands in an RGB/Grayscale Image" filed Nov. 8, 2012, and U.S. Provisional Application Ser. No. 61/776,719 entitled "Systems and Methods for Tracking Human Hands Using Parts Based Template Matching", filed Mar. 11, 2013. The disclosures of U.S. Provisional Patent Application Ser. Nos. 61/690,283, 61/796,359, and 61/776,719 are incorporated herein by reference in their entirety.

FIELD OF THE INVENTION

The present invention relates to object detection using machine vision and more specifically to detection of hands within a scene.

BACKGROUND

Real-time object detection is a challenging task in computer vision. A number of major algorithmic paradigms exist for performing object detection in two dimensional (2D) images including local 2D-descriptor based object detection processes, global 2D descriptor based (bag-of-words) object detection processes and template based object detection processes.

Local 2D-descriptor based approaches typically apply interest point detectors to detect salient points in an image, which are then characterized by a descriptor. The descriptor is matched against a database of descriptors found on the object of interest. An object hypothesis is formed if a sufficient number of such matches is found in the image. As a prerequisite, however, these methods typically require image corners or textured areas.

For objects that lack a sufficient number of image corners and/or textured areas to successfully perform a local 2D-descriptor based process, a global 2D descriptor can be utilized. A global 2D-descriptor can be formed by studying patch statistics. However, a global 2D-descriptor typically does not exploit the spatial relations of points of interest. Therefore, 2D-descriptors tends to produce a large number of false matches.

A more discriminative way of exploiting object appearance is to take spatial relations into account. This can be achieved by forming a template image of the object of interest. The template contains the relative spatial relation of information points on the object. An object hypothesis is formed in the image via template matching, which can involve sliding a template over each pixel (possibly after subsampling) and computing the similarity between an image patch and the template using a similarity metric.

SUMMARY OF THE INVENTION

Systems and methods in accordance with embodiments of the invention detect human hands using parts based template matching to enable gesture based interactive sessions with computing devices. One embodiment of the invention includes a processor, a reference camera configured to capture sequences of frames of video data, where each frame of video data comprises color information for a plurality of pixels, and memory containing: a hand tracking application; and a finger template comprising an edge features template. In addition, the hand tracking application configures the processor to: obtain a frame of video data from the reference camera; detect at least one candidate finger in the frame of video data received from the reference camera, where each of the at least one candidate finger is a grouping of pixels identified by searching the frame of video data for a grouping of pixels that have image gradient orientations that match the edge features of the finger template accounting for rotation and scaling differences; and verify the correct detection of a candidate finger by confirming that the colors of the pixels within the grouping of pixels identified as a candidate finger satisfy a skin color criterion.

In a further embodiment, a finger template is one of a plurality of edge feature templates that are rotated and scaled versions of the finger template; and the hand tracking application configures the processor to search the frame of video data for a grouping of pixels that have image gradient orientations that match the edge features of the finger template when the grouping of pixels and the edge feature template are scaled and rotated relative to each other by searching the frame of video data for a grouping of pixels that have image gradient orientations that match one of the plurality of edge feature templates.

In another embodiment, the hand tracking application configures the processor to search the frame of video data for a grouping of pixels that have image gradient orientations that match the edge features of the finger template when the grouping of pixels and the edge feature template are scaled and rotated relative to each other by: scaling and rotating groupings of pixels within the video image data; and; searching for scaled and rotated groups of pixels that have image gradient orientations that match the edge features of the finger template.

In a still further embodiment, the edge features of the finger template are synthetically generated.

In still another embodiment, the plurality of edge feature templates are stored in a data structure that includes metadata describing the rotation and scaling applied to the finger template to obtain a given edge feature template within the data structure.

In a yet further embodiment, the edge feature template is a binary edge map.

In yet another embodiment, the edge feature template is a map of image gradient orientations.

In a further embodiment again, the hand tracking application configures the processor to search the frame of video data for a grouping of pixels that have image gradient orientations that match a given edge feature template from the plurality of edge feature templates by: selecting a grouping of pixels; searching within a predetermined neighborhood of pixels relative to each edge feature in the given edge feature template to find the image gradient orientation that is most similar to the image gradient orientation of the edge feature; and determining the similarity of the grouping of pixels to the given edge feature template based upon a measure of the similarity of the most similar image gradient orientations found within the grouping of pixels for each of the edge features in the given edge feature template.

In another embodiment again, the hand tracking application configures the processor to determine image gradient orientation based upon a change in intensity of neighboring pixels in the video data.

In a further additional embodiment, the hand tracking application configures the processor to determine image gradient orientation based upon a change in the color of neighboring pixels in the video data in at least one color channel.

In another additional embodiment, the video data comprises color information for a plurality of pixels in blue, green and red color channels.

In a still yet further embodiment, the hand tracking application configures the processor to determine image gradient orientation by computing the orientation of gradients in red and green color channels separately and using the gradient orientation of the channel whose magnitude is the largest.

In still yet another embodiment, the hand tracking application configures the processor to determine image gradient orientation by computing the orientation of gradients in blue, green, and red color channels separately and using the gradient orientation of the channel whose magnitude is the largest.

In a still further embodiment again, the hand tracking application configures the processor to utilize an operator selected from the group consisting of the Sobel, Scharr, Roberts, Prewitt, Laplacian of Gaussian, and difference of Gaussians operators to approximate image gradient orientation based upon intensity values within at least a 3×3 region surrounding a pixel.

In still another embodiment again, the region is a 3×3 region or a 5×5 region.

In a still further additional embodiment, the hand tracking application configures the processor to search the frame of video data (I) for a grouping of pixels that have image gradient orientations that match a given edge feature template ($\mathcal{T}$) from the plurality of edge feature templates by determining whether the similarity of a number of gradient orientations extracted from the given edge feature template at a list P of locations r to be considered from edge features ($\mathcal{O}$) in the given edge feature template and image gradient orientations extracted from the frame of video data relative to a pixel location c exceed a predetermined matching threshold using the following similarity measure:

$$\varepsilon(I, T, c) = \sum_{r \in P} \left( \max_{t \in R(c+r)} |\cos(ori(O, r) - ori(I, t))| \right)$$

$$\text{where } R(c + r) = \left[ c + r - \frac{T}{2}, c + r + \frac{T}{2} \right] \times \left[ c + r - \frac{T}{2}, c + r + \frac{T}{2} \right]$$

defines a predetermined neighborhood of size T centered on the pixel location c+r within the frame of video data.

In still another additional embodiment, the hand tracking application configures the processor to quantize the image gradient orientations into a predetermined number ($n_o$) of values that can each be represented by a single bit.

In a yet further embodiment again, the hand tracking application configures the processor to calculate the similarity measure by spreading the quantized image gradient orientation at pixel location t (ori(I, t)) in a T×T window around the pixel location t and encoding the spread image gradient orientations using a binary string of length $n_o$, where each bit in the string corresponds to each quantized image gradient orientation present in the T×T window.

In yet another embodiment again, the hand tracking application configures the processor to: precompute lookup tables of $\max_{t \in R(c+r)} |\cos(ori(\mathcal{T}, r) - ori(I, t))|$ for each possible orientation ori($\mathcal{O}$, r) of an edge feature at a given pixel location t in the video image data; and evaluate the similarity measure for the given edge feature template using the precomputed lookup tables.

In a yet further additional embodiment, $n_o$ is between 5 and 8 and T is between 4 and 10.

In yet another additional embodiment, $n_o$=8 and T=5.

In a further additional embodiment again, the hand tracking application determines the pixel locations (c) searched within the frame of video data using information including the pixel location of a previously identified finger.

In another additional embodiment again, the hand tracking application determines the pixel locations searched within the frame of video data using information including the rotation of the edge feature template from the plurality of edge feature templates that matched of a previously identified finger.

In another further embodiment, the hand tracking application determines the pixel locations searched within the frame of video data using information including the scaling of the edge feature template from the plurality of edge feature templates that matched of a previously identified finger.

In still another further embodiment, the hand tracking application determines the pixel locations (c) searched using information further comprising the velocity of a previously identified finger.

In yet another further embodiment, the hand tracking application configures the processor to: detect the presence and initial location of at least one finger by recognizing an initialization gesture; and determine the pixel locations (c) searched within the frame of video data using information including the initial location of the at least one finger.

In another further embodiment again, the memory contains video data of a previous frame; and the hand tracking application configures the processor to determine the pixel locations (c) searched within the frame of video data using information including pixels in the frame of video data that have changed relative to the pixels in the video data of the previous frame.

In another further additional embodiment, the finger template further comprises a plurality of surface color pixel sample locations defined relative to the edge features template; and the hand tracking application configures the processor to confirm that the colors of the pixels within the grouping of pixels identified as a candidate finger satisfy a skin color criterion by confirming that the colors of the surface color pixel sample locations for the edge feature template from the plurality of edge feature templates that matches the grouping of pixels identified as a candidate finger satisfy a skin color criterion.

In still yet another further embodiment, the skin color criterion is a number of pixel sample locations having a color corresponding to a predetermined range of colors.

In still another further embodiment again, the skin color criterion is a ratio of pixel sample locations having a color corresponding to a predetermined range of colors relative to the overall number of pixel sample locations.

In still another further additional embodiment, the hand tracking application is configured to adapt the skin color criterion based upon at least one characteristic of the given edge feature template selected from the group consisting of the scale, and rotation of the given edge feature template relative to the finger template.

In yet another further embodiment again, the skin color criterion includes a histogram of skin colors and the surface color pixel samples are weighted according to the probability that a pixel is skin colored.

In yet another further additional embodiment, the skin color criterion includes a list of skin colors and pixels with a color corresponding to a color within the list of skin colors are considered to be skin colored.

In another further embodiment again, the skin color criterion considers at least one selected from the group consisting of: pixel intensity in all color channels; pixel intensity in the red and green color channels; and pixel intensity in the normalized red (R/(R+G+B)) and green (G/(R+G+B)) color channels.

In another further additional embodiment, the hand tracking application is configured to obtain skin color information for a specific user via an initialization process.

In a further embodiment, the hand tracking application further configures the processor to determine the position, rotation, and size of the at least one detected finger and to determine a hand pose from the location, orientation, and size of the at least one detected finger.

In another embodiment, the hand tracking application further configures the processor to verify the correct detection of a candidate finger by confirming that the detected finger belongs to a possible hand pose indicative of a correct identification of a finger.

In a still further embodiment, the hand tracking application further configures the processor to verify the correct detection of a candidate finger by confirming that the detected finger does not belong to a cluster of fingers indicative of knuckles.

In still another embodiment, the hand tracking application further configures the processor to detect a cluster of fingers and to infer hand pose using the detected cluster of fingers.

In a yet further embodiment, the hand tracking application further configures the processor to infer a hand pose including a pointing finger based upon a detected cluster of fingers.

In yet another embodiment, the hand tracking application configures the processor to determine a hand pose using a 3D model of a human hand based upon the location and orientation of the at least one detected finger.

In a further embodiment again, the hand tracking application configures the processor to determine a hand pose using priors concerning relative size of fingers and thumbs of a human hand based upon the location, orientation and size of the at least one detected finger.

In another embodiment again, the hand tracking application configures the processor to determine a hand pose using priors concerning the manner in which finger joints enable manipulation of fingers relative to the pose of a human hand based upon the location, orientation and size of the at least one detected finger.

A further additional embodiment also includes a display interface configured to drive a display device. In addition, the hand tracking application configures the processor to: determine a distance and orientation of a detected finger; map the determined distance and orientation of the detected finger to a location on the display device; and generate a target on the display device at the mapped location using the display interface.

Another additional embodiment also includes an integrated display device.

In a still yet further embodiment, the hand tracking application configures the processor to: determine the size of a tracked finger at a known distance from at least one initial frame of video data obtained from the reference camera during a registration process based upon the scaling of an edge feature template from the plurality of edge feature templates that matches the tracked finger; and determine the distance to a detected finger in the frame of video data obtained from the reference camera based upon the relative scale of the edge feature template from the plurality of edge feature templates that matches the grouping of pixels corresponding to the detected finger to the scaling of the edge feature template from the plurality of edge feature templates that matched the tracked finger during the registration process.

Still yet another embodiment also includes a depth sensor. In addition, the hand tracking application configures the processor to: obtain a depth map from the depth sensor; and determine a distance to the detected finger using the depth map.

A still further embodiment again also includes an alternate view camera configured to capture sequences of frames of video data, where each frame of video data comprises color information for a plurality of pixels. In addition, the hand tracking application configures the processor to: obtain a frame of video data from the alternate view camera; and determine a distance to the detected finger using disparity between the location of the detected finger in the frame of video data obtained from the reference camera and the frame of video data obtained from the alternate view camera.

In still another embodiment again, the hand tracking application configures the processor to: obtain a sequence of frames of video data from the reference camera; and determine hand pose based upon the trajectory in the sequence of frames of video data of at least one detected finger.

In a still further additional embodiment the hand tracking application configures the processor to: identify at least one detected finger forming a static gesture; and execute a command in response to the identification of the static gesture.

In still another additional embodiment, the hand tracking application configures the processor to: identify a trajectory in the sequence of frames of video data of at least one detected finger forming a dynamic gesture; and execute a command in response to the identification of the dynamic gesture.

An embodiment of the method of the invention includes: capturing a frame of video data using a reference camera, where the frame of video data comprises color information for a plurality of pixels; detecting at least one candidate finger in the frame of video data received from the reference camera using a processor configured using a hand tracking application, where each of the at least one candidate finger is a grouping of pixels identified by searching the frame of video data for a grouping of pixels that have image gradient orientations that match one of a plurality of edge feature templates that are rotated and scaled versions of a finger template; and verifying the correct detection of a candidate finger by using a processor configured by a hand tracking application to confirm that the colors of the pixels within the grouping of pixels identified as a candidate finger satisfy a skin color criterion.

BRIEF DESCRIPTION OF THE DRAWINGS

FIG. 1 is a high level block diagram of a system configured to perform real-time tracking of human hands and provide a gesture based interactive user interface.

FIG. 2 is a high level block diagram of an image processing system in accordance with an embodiment of the invention.

FIG. 4 conceptually illustrates a template that can be used to perform template matching of human fingers in real time.

FIG. 6A conceptually illustrates quantization of image gradient orientations.

FIG. 6B conceptually illustrates detection of image gradient orientations.

FIG. 6C conceptually illustrates spreading image gradient orientations across a 3×3 neighborhood.

FIG. 6D conceptually illustrates the binary encoding of the spread gradient orientations at each location within the image.

DETAILED DESCRIPTION

Figure 3:
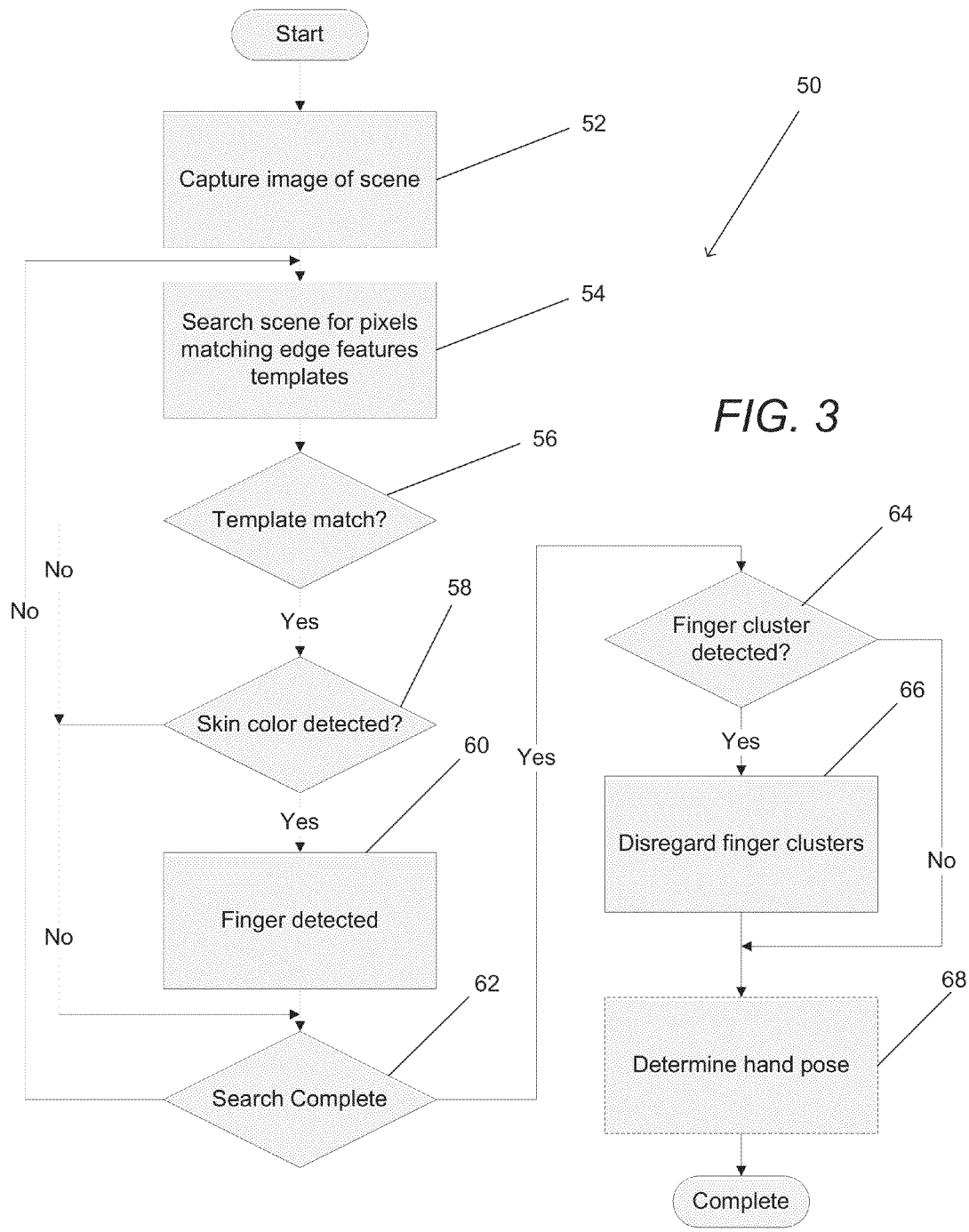
FIG. 3 is a flow chart illustrating a process for tracking human hands using parts based template matching.

Turning now to the drawings, systems and methods for tracking human hands using parts based template matching in accordance with embodiments of the invention are illustrated. The tracking of fingers and hands can present particular challenges relative to conventional object detection, because hands typically do not include significant texture and are not rigid. Tracking of hands can be useful in enabling humans to interact with machines, such as (but not limited to) personal computers, tablet computers, smart phones, and consumer electronics devices including (but not limited to) televisions, disc players, set top boxes, and game consoles. In order to enable gesture based interaction with applications in real time, greater than real time performance can be demanded from hand tracking systems. The smaller the computational overhead of the hand tracking processes, the more computational power available for rich applications.

In several embodiments, a parts based approach to template matching is utilized to detect individual fingers from which hand posture can be determined. In a number of embodiments, a template matching process is utilized that accounts for rotated and scaled fingers. In a number of embodiments, the template matching process utilizes multiple template matching modalities including (but not limited to) matching image gradient orientations along edges of a finger template and matching skin color on the surface of a candidate finger. Processes for reducing the computational complexity of matching an image gradient orientation template against an image were recently described in Hinterstoisser et al., "Gradient Response Maps for Real-Time Detection of Texture-Less Objects" *IEEE Transactions on Pattern Analysis and Machine Intelligence* (2012), the disclosure of which is incorporated by reference herein in its entirety. Processes similar to those described in the Hinterstoisser et al. publication can be utilized to identify candidate fingers within a captured image of a scene with low computational overhead in real-time applications. In several embodiments, surface color matching of the candidate fingers can be utilized to confirm the correct detection of a candidate finger. In a number of embodiments, image gradient orientation templates are generated based upon rotation and scaling of a synthetic template as opposed to using machine learning techniques and a set of training data to learn appropriate templates. Although templates learnt using such techniques can also be utilized. In several embodiments, the templates are stored in a data structure that includes metadata describing the rotation and scaling applied to the finger template to obtain a given template within the data structure. In a number of embodiments, the data structure is constructed to enable rapid searching for templates generated using bounded rotations and scalings of a selected template within the data structure. As is discussed further below, the metadata describing the templates can be used to prune template matching searches and/or determine information based upon relative scale and/or orientation of various matched templates. In other embodiments, any of a variety of techniques can be utilized to generate a set of templates that can be utilized during template matching and any of a number of different data structures and/or metadata can be associated with the templates to facilitate real-time template matching.

In many embodiments, multiple cameras are utilized to capture multiple views of a hand. In several embodiments, image gradient orientation template matching is used to identify a candidate finger in a reference view and the matched template can be utilized to search for a corresponding view of the candidate finger in one or more of the alternate view images. In several embodiments, the search is bounded with respect to the epipolar line between the reference camera and the alternate view camera. In a number of embodiments, the search for a corresponding view of a detected finger in an alternate view image is restricted based upon templates corresponding to various predetermined degrees of rotation in one or more degrees of freedom relative to the template that matched the candidate finger in the reference image. In many embodiments, the search for a corresponding view of a detected finger in an alternate view image is restricted based upon templates corresponding to a predetermined degree of scaling relative to the template that matched the candidate finger in the reference image. Based upon the disparity between the detected fingers in each of the multiple views, the distance of the finger from each of the cameras can be determined. In a number of embodiments, the image processing system can generate a depth map and/or a depth map is received from the camera system that captures the reference image. Where a depth map is available, the process of validating the detection of a candidate finger in a reference image can utilize pixel depth information to further bound the search for a matching view of the finger. The depth information can be utilized to determine the disparity between the two views and a search conducted within a bounded region surrounding the anticipated location of the finger in the alternate view.

In several embodiments, the distance, and orientation of candidate finger can be determined using a single camera based upon the scale of the matched template relative to the known size of the tracked finger. In a number of embodiments, the size of a finger can be determined by performing template matching at a known distance. The scale of the template that matches the finger at a known distance can then be utilized to determine depth based upon the relative scaling of templates that match the finger during freeform finger tracking.

Following detection of one or more candidate fingers, the fingers can be tracked to determine hand posture based upon the trajectory of one or more fingers over time using a 3D model of a human hand. Specific finger locations, distances, orientations, and motions can be recognized by an image processing system and used to enable interaction with a computing device. In a number of embodiments, the orientation of the finger is the 2D orientation of the detected finger within the captured image. In several embodiments, the orientation of the finger is the 3D orientation of the finger detected in the image relative to the camera and/or a display with which the user is interacting during a gesture based interactive session. In many embodiments, a real-time gesture based interactive system enables a user to interact with a display device by pointing at the display device. Hand detection processes in accordance with embodiments of the invention can be utilized to detect the distance of the user's hand and the orientation of the user's finger as it is pointing at the display device. The distance and orientation of the user's finger can be mapped to a location on a display device and a target overlaid on the display to provide visual feedback to the user. In this way, the user can move the target on the display and interact with a user interface by changing the orientation of the user's finger.

Systems and methods for tracking human hands using parts based template matching in accordance with embodiments of the invention are discussed further below.

Real-Time Gesture Based Interactive Systems

A real-time gesture based interactive system in accordance with an embodiment of the invention is illustrated in FIG. 1. The real-time gesture based interactive system 10 includes an image processing system 12 configured to receive image data captured by at least one camera 14. In many embodiments, the real-time gesture based interactive system 10 processes the captured image data to determine the location and pose of a human hand. Gestures can be static (i.e. a user placing her or his hand in a specific pose) or dynamic (i.e. a user transition her or his hand through a prescribed sequence of poses). Based upon changes in the pose of the human hand and/or changes in the pose of a part of the human hand over time, the image processing system can detect dynamic gestures. In a number of embodiments, the real-time gesture based interactive system 10 includes a display 18 via which the real-time gesture based interactive system can present a user interface to the user. By detecting gestures, the real-time gesture based interactive system can enable the user to interact with the user interface presented via the display.

As noted above, object detection of human hands can be challenging due to the fact that hands typically have very low texture and are not rigid. In several embodiments, the real-time gesture based interactive system uses a parts based template matching process to detect individual fingers from which hand pose can be inferred. In a number of embodiments, a variety of templates are generated by rotating and scaling an edge template. Using template matching processes optimized for low computational load in real-time applications, the templates can be utilized to detect candidate fingers in one or more views of a scene. In several embodiments, the templates combine multiple template matching modalities including (but not limited to) using the image gradient orientations of the edge template and applying a skin color classifier to a sparse sampling of pixels on the surface of candidate fingers. In many embodiments, detection of a candidate finger can be validated by detecting alternate views of the candidate finger, and/or by detecting clusters of fingers that may correspond to knuckles and/or other clusters of objects and candidate fingers that may correspond to patterns within a scene that would otherwise result in an incorrect classification.

In many embodiments, the real-time gesture based interactive system detects the location, and distance of a detected finger and overlays a target on the display at a location corresponding to the location on the display being pointed at by the detected finger. The real-time gesture based interactive system can track the location, distance, and orientation of the detected finger over time, enabling the user to interact with a user interface presented on the display by pointing at different elements of the user interface. Tracked motion of a finger and/or gesture in 3D space can be mapped to a 2D space within a user interface presented on a display device. In several embodiments, another dimension such as (but not limited to) level of zoom, change of color, and/or speed can be used to perform the 3D mapping. In several embodiments, an interaction zone is defined in 3D space and motion of a finger and/or gestures within a plane in the interaction zone parallel to the plane of the display can be utilized to determine the location on which to overlay a target on the display. For example, in a number of embodiments motion of the tip of a finger within a 2D plane can be used to determine the amount to move a target on a display. In several embodiments, the 3D orientation of the finger can be used to identify a location on a display at which a user's finger is pointing. Accordingly, in certain embodiments a target is moved on the display based upon the direction in which the user's finger is pointing. In other embodiments, any of a variety of techniques can be utilized to map the orientation of one or more detected fingers to locations on a display as part of a gesture based interactive session. In a number of embodiments, the tracked motion in three dimensional space (potentially within an interaction zone) is also mapped to events supported by the operating system including (but not limited to) mouse or pen events. In many embodiments, specific static and/or dynamic gestures can be identified and adapter software running on the real-time gesture based interactive system can map specific static and/or dynamic gestures to a particular defined action within an interactive application. Additional information concerning the manner in which gestures can be utilized to drive interactivity in real-time gesture based interactive systems is disclosed in U.S. application Ser. No. 13/757,705 entitled "Method and System Enabling Natural User Interface Gestures with an Electronic System" filed Feb. 1, 2013, the disclosure of which is incorporated by reference herein in its entirety.

As can readily be appreciated, the computational load of the real-time finger template matching process impacts the overall performance of the image processing system. The lower the computational load, the greater the resources available for the image processing system to execute rich interactive applications. Although a specific image processing system including two cameras is illustrated in FIG. 1, any of a variety of processing systems configured to capture image data from at least one view can be utilized as appropriate to the requirements of specific applications in accordance with embodiments of the invention. Image processing systems in accordance with embodiments of the invention are discussed further below.

Image Processing Systems

Image processing systems in accordance with embodiments of the invention can be implemented using a variety of software configurable computing devices including (but not limited to) personal computers, tablet computers, smart phones, embedded devices and consumer electronics devices such as (but not limited to) televisions, disc players, set top boxes, and game consoles. An image processing system in accordance with an embodiment of the invention is illustrated in FIG. 2. The image processing system 20 includes a processor 22 that is configured to communicate with a camera interface 24 and a display interface 26. The image processing system also includes memory, which can take the form of one or more different types of storage including semiconductor and/or disk based storage. In the illustrated embodiment, the processor 22 is configured using an operating system 30. Where the image processing system is part of an embedded system, the image processing system may not utilize an operating system. Referring back to FIG. 2, the memory 28 also includes a hand tracking application 32 and may include an interactive application 34. As is discussed further below, the hand tracking application can be utilized to process image data received via the camera interface 24 to identify hand gestures and/or the orientation and distance of individual fingers. These hand gestures can be processed by the processor 22 to enable the user interact with a user interface generated by the operating system 34 and/or the interactive application 30.

In many embodiments, the processor receives frames of video data via the camera interface 24 from at least one camera. The camera interface can be any of a variety of interfaces appropriate to the requirements of a specific application including (but not limited to) the USB 2.0 or 3.0 interface standards specified by USB-IF, Inc. of Beaverton, Oreg., and the MIPI-CSI2 interface specified by the MIPI Alliance. In a number of embodiments, the received frames of video data include image data represented using the RGB color model represented as intensity values in three color channels. In several embodiments, the received frames of video data include monochrome image data represented using intensity values in a single color channel. In several embodiments, the image data represents visible light. In other embodiments, the image data represents intensity of light in non-visible portions of the spectrum including (but not limited to) the infrared near-infrared and ultraviolet portions of the spectrum. In certain embodiments, the image data can be generated based upon electrical signals derived from other sources including but not limited to ultrasound signals. In several embodiments, the received frames of video data are compressed using the Motion JPEG video format (ISO/IEC JTC1/SC29/WG10) specified by the Joint Photographic Experts Group. In a number of embodiments, the frames of video data are encoded using a block based video encoding scheme such as (but not limited to) the H.264/MPEG-4 Part 10 (Advanced Video Coding) standard jointly developed by the ITU-T Video Coding Experts Group (VCEG) together with the ISO/IEC JTC1 Motion Picture Experts Group. In certain embodiments, the image processing system receives RAW image data. In several embodiments, the camera systems that capture the image data also include the capability to capture dense depth maps and the image processing system is configured to utilize the dense depth maps in processing the image data received from the at least one camera system. In several embodiments, the camera systems include 3D sensors that capture dense depth maps including (but not limited to) time-of-flight cameras.

In many embodiments, the display interface 26 is utilized to drive a display device that can be integrated within the image processing system and/or external to the image processing system. In a number of embodiments, the HDMI High Definition Multimedia Interface specified by HDMI Licensing, LLC of Sunnyvale, Calif. is utilized to interface with the display device. In other embodiments, any of a variety of display interfaces appropriate to the requirements of a specific application can be utilized.

Although a specific image processing system is illustrated in FIG. 2, any of a variety of image processing system architectures capable of executing hand tracking processes can be utilized in accordance with embodiments of the invention. Processes for tracking human hands using parts based template matching in accordance with embodiments of the invention are discussed further below.

Processing for Tracking Human Hands

Processes for determining pose and tracking human hands in accordance with embodiments of the invention involve using a parts based template matching process to identify individual fingers. In several embodiments, hand pose can be inferred based upon identified fingers. In a number of embodiments, the template matching process involves utilizing a number of template matching modalities including (but not limited) the use of image gradient orientations of template edges and skin color classification of candidate finger surface pixels. In many embodiments, additional modalities can be considered including surface normal and/or any other characteristic that can be derived on a per pixel basis from image data of a scene captured from at least one view.

A process for determining hand pose using a parts based template matching process in accordance with an embodiment of the invention is illustrated in FIG. 3. The process 50 includes capturing (52) images of a scene from at least one viewpoint. A search can be conducted within the image(s) for groupings of pixel that match one of a number of finger templates. In a number of embodiments, the search leverages information concerning the location, scale, and/or orientation of tracked fingers and/or the scale and/or rotation of edge feature templates that matched tracked fingers from previous frames, and/or information concerning speed and trajectory of observed motion in order to increase the likelihood that a previously detected finger can be rapidly located without searching the entire frame. Searches can be further simplified by only searching locations in which fingers were previously detected and regions where pixels changed from one frame to the next. As is discussed further below, in a number of embodiments that include an image processing system capable of generating a dense depth map the search is constrained to a set of pixels and/or a bounded region identified using a depth map and/or a combination of the depth map with additional information including (but not limited to) information concerning pixel motion. As is discussed below, any of a variety of real-time template matching processes can be utilized including processes that match templates based upon image gradient orientations similar to those disclosed in the Hinterstoisser et al. publication, which is incorporated by reference above.

In several embodiments, the image is initially searched for groups of pixels having image gradient orientations matching the outline of a finger. When a determination (56) is made that a candidate finger has been detected by the first template matching modality (54), then pixels on the surface of the candidate finger can be analyzed using a skin color classifier (58). When skin color is detected, the process concludes (60) that a finger is present.

In many embodiments, the template matching process utilizes a template similar to the template illustrated in FIG. 4. The illustrated template 80 defines an edge 82 and a plurality of pixel locations 84. The edge 82 can be utilized to perform edge detection using techniques including (but not limited to) the image gradient orientation technique disclosed in the Hinterstoisser et al. publication. The pixel locations 84 can be utilized to identify surface pixels on a candidate feature for the purpose of performing skin color classification. As is discussed further below, processing efficiencies can be obtained by first identifying candidate fingers using the edges of the template and then validating the detection of a candidate finger using a skin color classifier. Although a specific template is illustrated in FIG. 4, any of a variety of templates can be utilized to identify parts of a human hand including (but not limited to) fingers in accordance with embodiments of the invention.

In order to perform template matching, various versions of the template can be generated and stored in a data structure that can be rapidly traversed and pruned during the template matching search. In several embodiments, the set of templates that is used to perform template matching is generated through rotation and scaling of a base finger template. In other embodiments, a single template can be utilized and the image in which the search is being conducted can be scaled and/or rotated to normalize the object size within the image. The basic template can be a synthetic shape chosen based upon template matching performance (as opposed to a shape learnt by analysis of images of fingers). By application of appropriate rotation and scaling, the template matching process can limit the impact of variation in size, orientation, and distance of a finger from the camera(s) on the ability of the image processing system to detect the finger.

Referring again to the process 50 illustrated in FIG. 3, the template matching process continues to iterate until the search of the image is complete (62). At which point, the identified fingers can be analyzed (64) to determine the presence of finger clusters and/or other patterns of objects indicative of an incorrect identification of a finger. In many embodiments, specific clusters of fingers are likely indicative of knuckles and not of fingers per se. In which case, fingers detected in the finger cluster can be disregarded (66) and/or the finger cluster utilized to infer (68) pose information concerning the hand. In several embodiments, a finger cluster indicative of knuckles can be used to assist in the identification of a pointing finger. In many embodiments, image processing systems simply track fingers. In a number of embodiments, detected fingers can be utilized to infer (68) hand pose based upon priors concerning the relative size of fingers and thumbs, and the manner in which finger joints enable manipulation of fingers relative to the pose of the overall hand.

Although specific processes are described above with reference to FIG. 4, any of a variety of processes can be utilized to detect groups of pixels corresponding to fingers within a scene, and to validate finger detections in accordance with embodiments of the invention. As is discussed further below, candidate fingers can be further validated using alternate views of the fingers. In addition, alternate views can be utilized to obtain depth information that also informs inferences of hand pose from detected fingers. Processes for performing template matching to detect fingers in accordance with embodiments of the invention are discussed further below.

Accelerating Template Matching

Figure 5A:
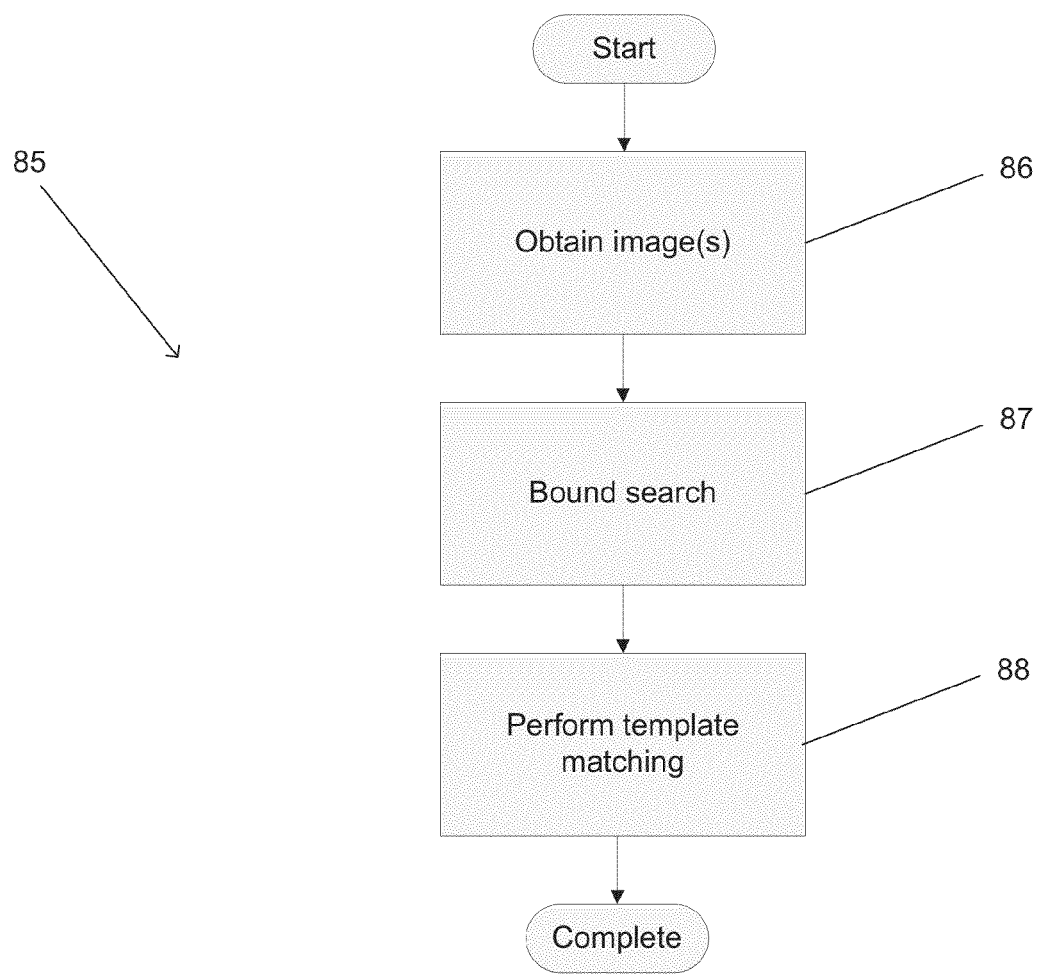
FIG. 5A is a flow chart illustrating a high level process for performing parts based template matching including bounding the pixels within an image that are searched using template matching in order to identify a candidate human finger in accordance with an embodiment of the invention.

A variety of approaches can be utilized to perform template matching, which typically involve performing computations with respect to each pixel location considered within a captured image. As noted above, a number of strategies can be utilized to reduce the number of pixel locations within a captured image that are searched when performing template matching. A process of bounding a search and performing template matching in accordance with an embodiment of the invention is illustrated in FIG. 5A. The process involves obtaining (86) one or more images of a scene. In several embodiments, images can be captured from one or more views over time. As is discussed further below, images captured over time can be utilized to identify motion within a scene and images captured from different viewpoints can be utilized to determine distance to objects within the scene. A search for an object within a scene, such as a finger, using template matching can be bounded (87) using information including (but not limited to) information concerning motion within the scene, depth of objects within the scene, and the location, distance, velocity and/or orientation of the object in previously captured images of the scene. Template matching can then be performed (88) with respect to a subset of pixels and/or one or more bounded regions. In circumstances where the computational effort in identifying the subset of pixels and/or the one or more bounded regions in which to search is less than the effort to perform template matching with respect to the pixel locations eliminated during the bounding process, then the bounding process effectively accelerates the overall template matching process. Processes for bounding a search and performing template matching in accordance with embodiments of the invention are discussed further below.

Bounding Searches

When an image processing system receives a sequence of frames of video data captured from a single viewpoint, then motion between successive frames of video data captured from the viewpoint can be utilized to identify pixels that could correspond to a candidate finger. In a number of embodiments, an image processing system receives images of a scene captured from multiple viewpoints. By performing a disparity search between a reference viewpoint and one or more alternate viewpoints, a dense depth map of the scene can be generated. A dense depth map can be contrasted with using disparity to measure the distance between two groups of pixels identified in a reference frame and an alternate view frame using template matching. A dense depth map provides depth information with respect to an image captured from a reference viewpoint and is not limited to determining the depth of a single previously detected object within the scene. A dense depth map can be utilized to identify pixels that could correspond to a candidate finger. A dense depth map can also be obtained using depth or 3D sensors such as, but not limited to, a time-of-flight or a structured light camera. In many embodiments, motion data is utilized to generate a motion mask (i.e. a bitmap indicating pixels that change between successive frames) and the motion mask can be applied to the depth map to provide information concerning the distance to objects that are moving within the scene. Utilizing information concerning depth, and/or motion, an image processing system can identify a subset of pixels within a captured image and/or a bounded region within a scene to search when performing template matching. In many embodiments, information concerning motion and/or depth is supplemented with information including the location, velocity, distance, and/or orientation of a finger detected in a previously captured image of the scene when identify a subset of pixels within a captured image to search during template matching.

Figure 5B:
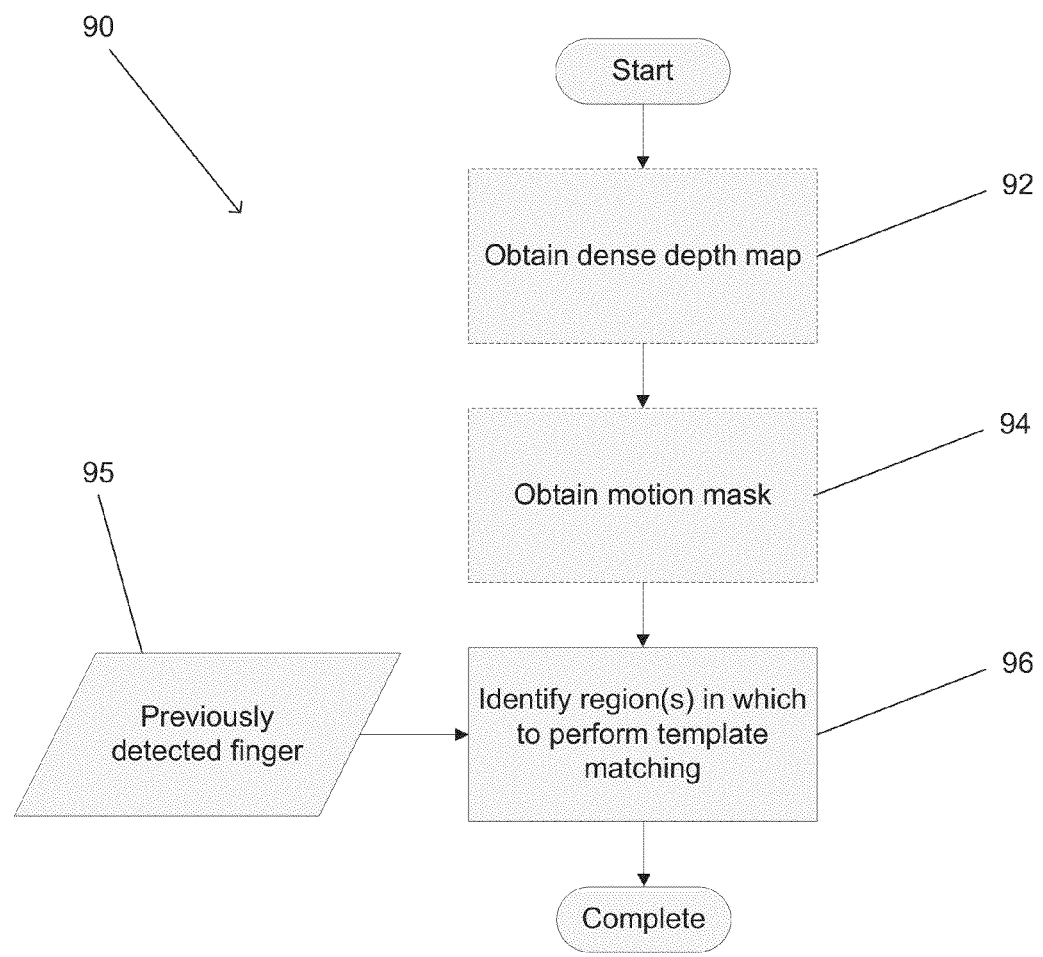
FIG. 5B is a flow chart illustrating a process for bounding the pixels within an image that are searched using template matching in order to identify a candidate human finger in accordance with an embodiment of the invention.

A process to identify a subset of pixels within a captured image to search when performing template matching in accordance with an embodiment of the invention is illustrated in FIG. 5B. The process 90 includes obtaining a dense depth map (92) and/or a motion mask (94) with respect to a captured image of a scene. Information concerning motion and distance can be combined with data (95) concerning a finger detected in a previous frame of video captured from the viewpoint including (but not limited to) pixel location(s), velocity, distance, and/or orientation of the previously detected finger. An image processing system can utilize the available information to identify (96) regions in which to perform template matching. As is discussed further below, any of a variety of predetermined criterion can be utilized to identify regions in which to perform template matching.

In several embodiments, a dense depth map is obtained by capturing at least one alternate view of the scene and using disparity between the reference view and the alternate view(s) to determine distance to objects visible in the scene. In many embodiments, the process of generating the depth map can also include the generation of a confidence map that provides information concerning the reliability of a particular depth measurement and the confidence map can be considered in determining whether to exclude specific pixels based upon the corresponding depth of the pixels. In many embodiments, a depth map is obtained using a depth or 3D sensor such as (but not limited to) a time-of-flight or structured light camera.

In a number of embodiments, pixel motion can be detected using any of a variety of techniques including but not limited to subtracting successive pairs of frames of video to identify pixel value differences exceeding a predetermined threshold. In other embodiments, any of a variety of techniques for efficiently detecting pixel motion can be utilized as appropriate to the requirements of specific applications.

When a depth map and a motion mask are available, the motion mask can be applied to the depth map using a binary AND operation to yield a depth map that only shows depth information for pixels that are moving. Any of a variety of predetermined criterion can then be utilized to identify one or more regions to search when performing template matching. In several embodiments, the image processing system determines the pixels to search based upon the closest moving pixel(s) in the image captured of the scene. In certain embodiments, all (moving) pixels within a predetermined distance of the closest moving pixel(s) are identified. In a number of embodiments, a bounded region in which to conduct a search when performing template matching can be selected as a region that encompasses at least one of: the largest group of identified pixels; the union of all the identified pixels; or groups of identified pixels that are likely to correspond to a pointing finger. To identify a region containing a pointing finger, in some embodiments the topmost portion of a previously identified bounded region is selected. In other embodiments, the 3D shape of the extracted region is searched for a subset of 3D points that forms a relatively (with respect to the full shape) narrow, elongated, straight structure. Additional information concerning the locations in which fingers have previously been detected in the scene can also be utilized to select identified pixels.

Although specific processes for reducing the number of pixels that are searched when performing template matching are described above with respect to FIG. 5B, any of a variety of techniques can be utilized to reduce the number of pixels that are considered when performing template matching as appropriate to the requirements of specific applications in accordance with embodiments of the invention. Furthermore, template matching can also be performed without directly limiting the pixels that are searched. An image can simply be captured and a search can be performed until a predetermined number of finger(s) is detected with respect to pixels searched in an order that may be informed by information concerning the location, distance, velocity, and/or orientation of finger(s) detected in previous frames of video data. Processes for performing template matching in accordance with embodiments of the invention are discussed further below.

Finger Detection Using Multi-Modality Template Matching

From the perspective of machine vision, hands are characterized by low texture and a lack of rigidity. As noted above, hand pose can be determined by decomposing hands into parts. The parts of a hand that can typically provide the greatest information concerning hand pose are the articulated joints and specifically the fingers. Therefore, by performing finger tracking, information can be obtained concerning the pose and orientation of individual fingers and the overall pose and orientation of a human hand. As noted above, template matching processes involving performing image gradient orientation matching can be efficiently implemented to achieve real time performance. Use of a single synthetically generated template similar to the template described above with reference to FIG. 4 to generate a set of scaled and rotated templates that are searched during template matching can greatly reduce computational complexity by reducing the number of templates considered during the template matching process relative to a process that utilizes multiple different templates corresponding to different real world finger types obtained using a machine learning technique based upon a training data set of images of fingers as the basis for generating a database of scaled and rotated finger templates. In other embodiments, any of a variety of template matching processes including (but not limited to) image gradient magnitude matching involving a binary mask of the edges of an object silhouette can be utilized as appropriate to the requirements of specific applications. In several embodiments, templates such as, but not limited to, binary masks of the edges of an object silhouette can similarly accommodate uncertainty through the spreading of the mask into a region of neighboring pixels.

In several embodiments, the process of performing image gradient orientation matching involves using a similarity measure that, for each gradient orientation on a template, searches in a neighborhood of the associated gradient location for the most similar orientation within the image of the scene. The term image gradient is typically used to refer to a directional change in the intensity or color of an image. In many applications, the Sobel operator is used to approximate image gradient based upon intensity values within a 3×3 region surrounding a pixel. In other instances, any of a variety of techniques can be utilized to determine image gradient including but not limited to the use of the Scharr, Roberts, Prewitt, Laplacian of Gaussian (LoG), and/or difference of Gaussian (DoG) operators. Image gradients are typically highly discriminating and invariant to illumination change and noise when utilized in template matching applications. Image gradients are also a reliable image cue with respect to texture-less objects such as hands. Considering only the orientation of the gradients and not their norms makes the measure robust to contrast changes, and taking the absolute value of cosine between them provides a similarity measure that can tolerate object occlusion boundaries. Furthermore, template matching performance is largely unaffected by background brightness.

In many embodiments, robustness is increased by computing the orientation of gradients in Red and Green color channels of the input image separately and for each image location using the gradient orientation of the channel whose magnitude is the largest. Given an RGB color image I, the gradient orientation map $I_\theta(x)$ at location x can be computed as follows:

$$I_\theta(x) = ori(I_{\hat{C}}(x))$$

where $$\hat{C} = \underset{C \in \{R,G\}}{\operatorname{argmax}} \left\| \frac{\partial I_C}{\partial x} \right\|$$

and R, G are the Red and Green channels of the corresponding color image.

Use of the Red and Green channels only from RGB image data can facilitate detection of skin colored objects using gradient image orientation. In several embodiments, the Blue color channel can also contain useful information and the gradient orientation map can be determined based upon the gradient orientation of the image gradient in each of the Red, Green, and Blue color channels that has the largest magnitude.

A template $\mathcal{T}$ can be defined using a list P of locations r to be considered from the template image $\mathcal{O}$. The locations r can be defined in terms of shifts from a pixel location in the image c. As described above, the process of selecting the order in which the pixels c are searched can involve utilizing contextual knowledge including (but not limited to) the location, and/or velocity, of previously identified fingers. In several embodiments, the location and/or velocity of a finger can be obtained by first detecting the presence of a predetermined initialization gesture and the search can be constrained to regions determined based upon the location and/or velocity of a finger detected during the identification of the initialization gesture. Processes for detecting initialization gestures are described in U.S. Provisional Patent Application Ser. No. 61/776,590, entitled "Systems and Methods for Initializing Motion Tracking of Human Hands", filed Mar. 11, 2013, the disclosure of which is incorporated by reference herein in its entirety. In addition, from one frame to the next, c can be limited to pixel locations where fingers were previously detected, and/or pixels or regions surrounding pixels that changed by an amount exceeding a threshold. In several embodiments, techniques including (but not limited to) background subtraction and/or change detection processes. When performing template matching, the similarity of a number of gradient orientations extracted from a template $\mathcal{T}$ and gradient orientations extracted from an image I of a scene can be evaluated using the following expression:

$$\varepsilon(I, T, c) = \sum_{r \in P} \left( \max_{t \in R(c+r)} |\cos(ori(O, r) - ori(I, t))| \right)$$

where $R(c + r) = \left[ c + r - \frac{T}{2}, c + r + \frac{T}{2} \right] \times \left[ c + r - \frac{T}{2}, c + r + \frac{T}{2} \right]$ defines the neighborhood of size T centered on location c+r in the input image.

Figure 5C:
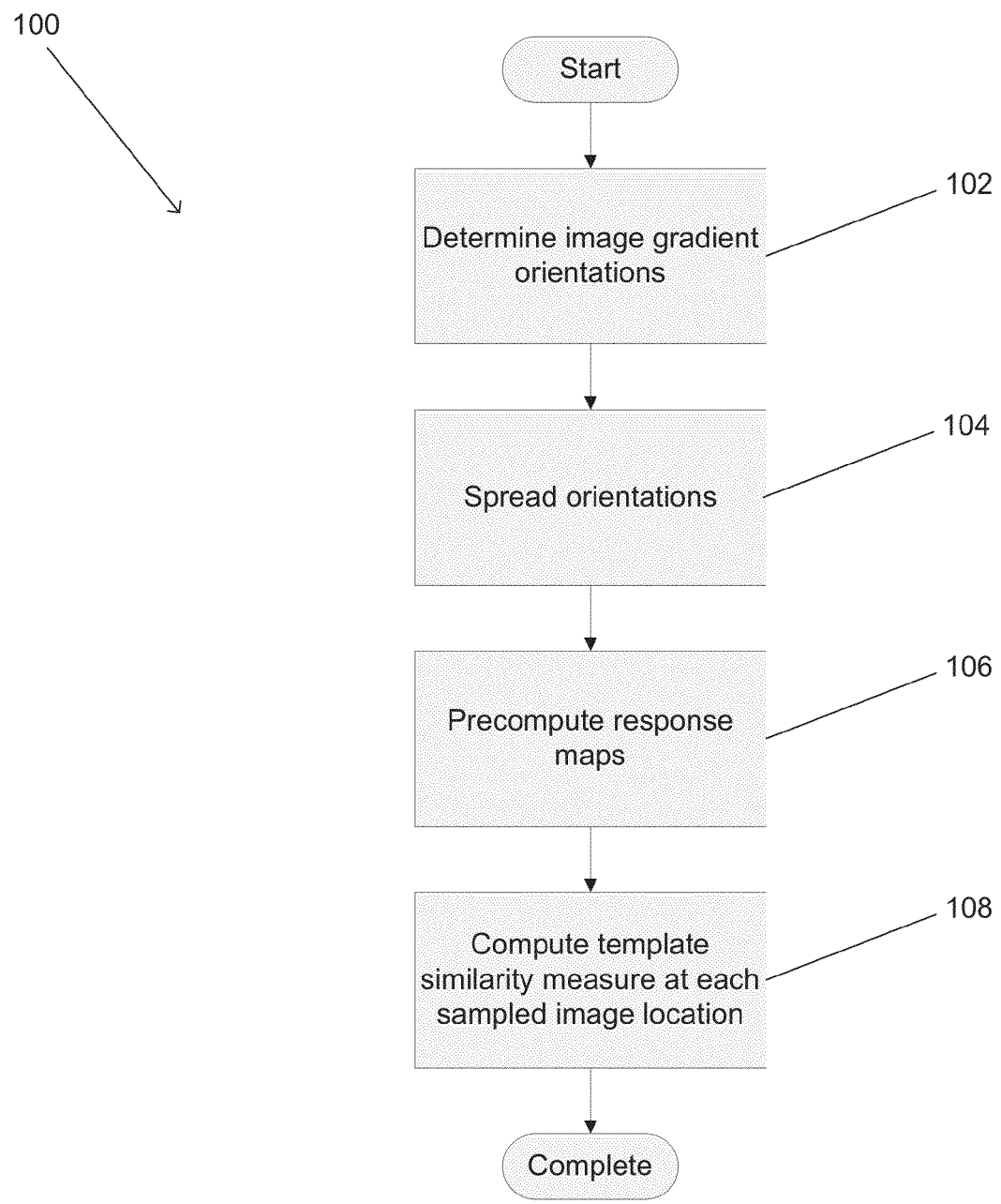
FIG. 5C is a flow chart illustrating a process for performing template matching using image gradient orientations in real time.

An efficient process for performing image gradient orientation template matching in accordance with an embodiment of the invention is illustrated in FIG. 5. The process 100 includes determining (102) image gradient orientations for pixel locations within an image. The image gradient orientations can be quantized into a small number $n_o$ of values. The quantization of image gradient orientations is conceptually illustrated in FIG. 6A. The image gradient orientations ori(I,t) can then be spread (104) in a T×T window around their locations. The process of spreading the image gradient orientations 122 in the image 124 shown in FIG. 6B is illustrated in FIG. 6C. The image gradient orientation 126 is spread to adjacent pixels in a 3×3 window 128. As can readily be seen, the image gradient orientation 01000 (126) is spread to a neighboring pixel location 130 to which the image gradient orientation 10000 is spread from a third neighboring pixel location 132.

For efficiency, the possible combination of image gradient orientations spread to a given image location m can be encoded using a binary string of length $n_o$, where each bit in the string corresponds to a specific gradient orientation. As is discussed further below, these strings can be used as indices to access lookup tables for fast precomputation of the similarity measure. Binary representations of spread image gradient orientations are conceptually illustrated in FIG. 6D. The pixel location 130 from FIG. 6C to which both the image gradient 01000 and 10000 were spread is shown as having the binary representation of 11000 in the spread image gradient map 135 shown in FIG. 6D. Although FIGS. 6A-6D utilize five bits ($n_o=5$) to quantize image gradient orientations and spread the gradients in a 3×3 window of pixels (T=3), any value for $n_o$ and T can be utilized in accordance with embodiments of the invention. In a number of embodiments, $n_o=8$ and T=5. In several embodiments, VGA images are searched and $n_o$ is between 5 and 8 and T is between 4 and 10. In other embodiments, $n_o$ and T are selected as appropriate to the requirements of a specific application.

Using the binary representation, a template match can be computed very efficiently. The spread image gradient orientations in each pixel location can be utilized to precompute (106) response maps. In several embodiments, lookup tables can be used to precompute $\max_{t \in R(c+r)}|\cos(ori(\mathcal{O}, r) - ori(I, t))|$ for each possible orientation $ori(\mathcal{O}, r)$ in the template. In many embodiments, the computations are performed using a lookup table and a response map $S_i(c)$ is obtained for each of the $n_o$ quantized orientations.

The similarity of a given template to an image at a given pixel location within the image can be computed (108) using the precomputed similarity maps as follows:

$$\varepsilon(I, T, c) = \sum_{r \in P} (S_{ori(O,r)}(c + r))$$

Since the maps $S_i(c)$ are shared between the templates, matching several templates against the input image can be done very fast once the maps are computed. At a given pixel location c the similarity of all templates can be determined and any templates exceeding a predetermined threshold can be considered to indicate the presence of a candidate finger.

Although specific processes are described above with respect to FIGS. 5 and 6A-6D for identifying candidate fingers using image gradient orientation template matching, any of a variety template matching processes that are robust and capable of real-time performance can be utilized as appropriate to the requirements of specific applications in accordance with embodiments of the invention. Processes for confirming finger detection by applying skin color classifiers to candidate fingers identified using template matching are discussed further below.

Verifying Finger Detection Using Skin Color Classifiers

In order to reduce the incidence of false positives during finger detection, a skin color classifier can be utilized as a second modality during template matching. In many embodiments, the template indicates a small number of pixels that can be sampled and compared to a predetermined set of skin colors to determine whether the surface of a candidate finger is skin colored. If the candidate finger surface is skin colored, then the finger detection is verified. Otherwise, the candidate finger identified by the initial template matching process is determined to be a false positive. Although much of the discussion assumes that the skin color classifier is performed after a template match is located, in a number of embodiments the similarity measure used during the template matching process can consider both skin color and image gradient orientation. Furthermore, skin color matching can be used in combination with other verification processes including (but not limited to) observing an alternate view of the candidate finger in an image captured by one or more additional cameras.

Figure 7:
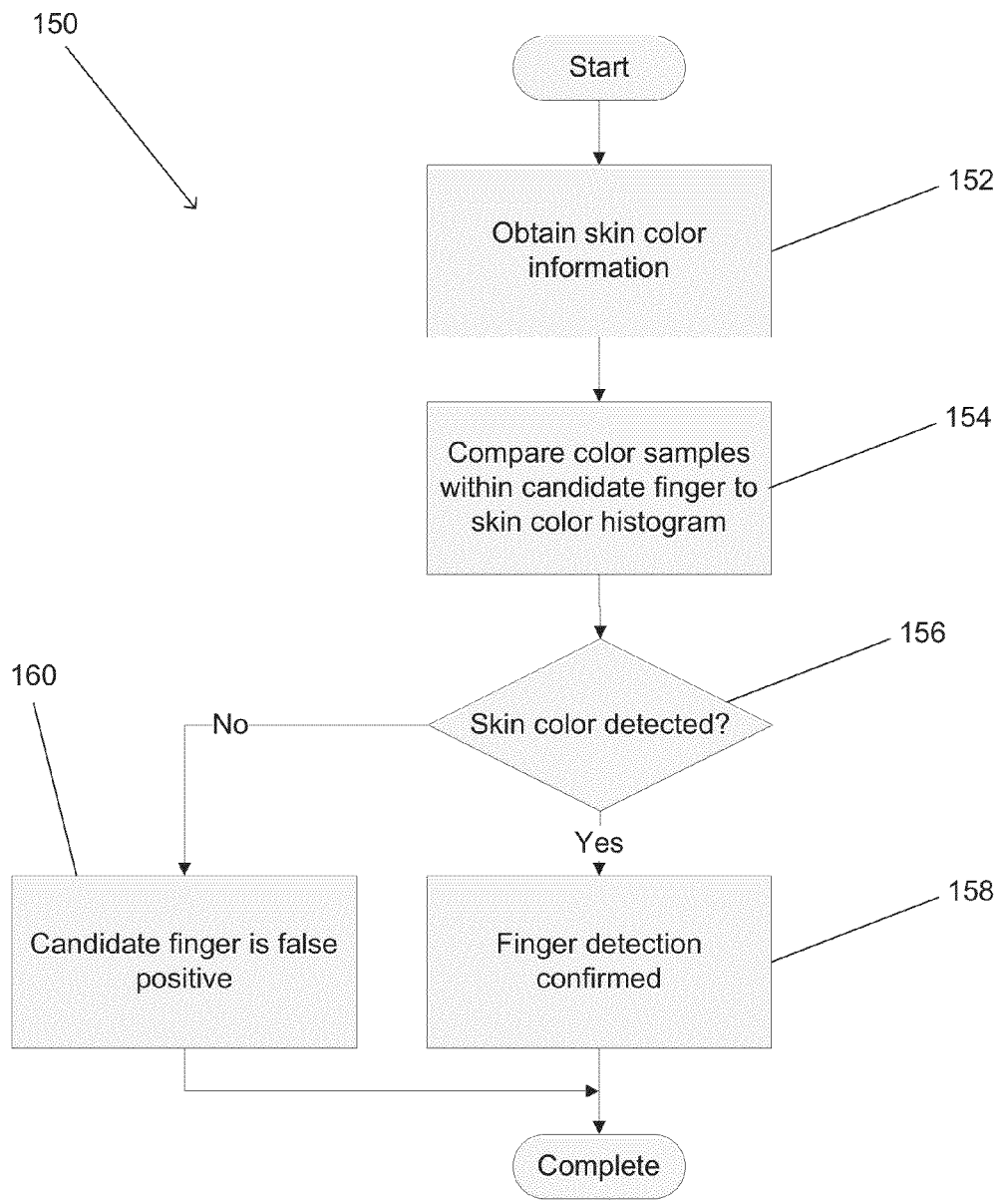
FIG. 7 is a flow chart illustrating a process for template matching using a second modality involving detecting the presence of skin color tones on the surface of a candidate finger in accordance with an embodiment of the invention.

A process for determining whether a candidate finger is skin colored in accordance with an embodiment of the invention is illustrated in FIG. 7. The process 150 includes obtaining (152) skin color information. In a number of embodiments, general skin color information is obtained that includes colors that can be considered to fall within the range of human skin colors. In several embodiments, skin color information can be obtained with respect to the skin color of a specific user via an initialization process similar to the initialization process described in U.S. Provisional Patent Application Ser. No. 61/776,590 entitled "Systems and Methods for Initializing Motion Tracking of Human Hands" filed Mar. 11, 2013, the disclosure of which is incorporated by reference above.

Color samples on the surface of the candidate finger can be compared (154) to the skin color information to determine (156) whether the color samples are skin colored. In several embodiments, the surface of the candidate finger can be sparsely sampled and a decision made based upon a predetermined threshold number and/or ratio of pixels being skin colored. In many embodiments, the criterion used to determine whether a candidate finger is skin colored adapts based upon factors including (but not limited to) the scale and/or rotation of the matching template for the candidate finger. In several embodiments, the skin color information includes a histogram of skin colors and the color samples are weighted according to the probability that a pixel is skin colored. In many embodiments, color information includes a list of skin colors and pixel with a color corresponding to a color within the list of skin colors is considered to be skin colored. In a number of embodiments, skin color can be determined based upon pixel intensity in all color channels, the Red and Green color channels, the intensity normalized Red (R/(R+G+B)) and Green (G/(R+G+B)) color channels, and/or any other color representation appropriate to the requirements of a specific application. When the surface of the candidate finger is determined to be skin colored, a finger detection is confirmed (158). When the surface of the candidate finger is found not to be skin colored, then the candidate finger is determined (160) to be a false positive.

Although specific processes for classifying candidate fingers using skin color are described above with reference to FIG. 7, any of a variety of skin color classification processes can be utilized in accordance with embodiments of the invention to confirm the detection of a finger within a scene. Additional processes for confirming finger detections that can be utilized as an alternative or in combination with a skin color classifier including looking for patterns of objects within a scene, such as (but not limited to) candidate finger clusters, that are indicative that a given candidate finger detected using template matching is a false positives are discussed further below.

Detecting Patterns of Objects Indicative of False Positives

Finger detection processes in accordance with embodiments of the invention can be improved by searching for patterns of objects within a scene that may be indicative of a false detection. Image processing systems in accordance with many embodiments of the invention enable user interaction via gestures using a single extended finger. In such applications, template matching processes similar to those outlined above can result in detections of clusters of candidate fingers along the user's knuckles. In other embodiments, any of a variety of patterns of false detections can be identified and used to screen candidate finger detections obtained via template matching.

Figure 8:
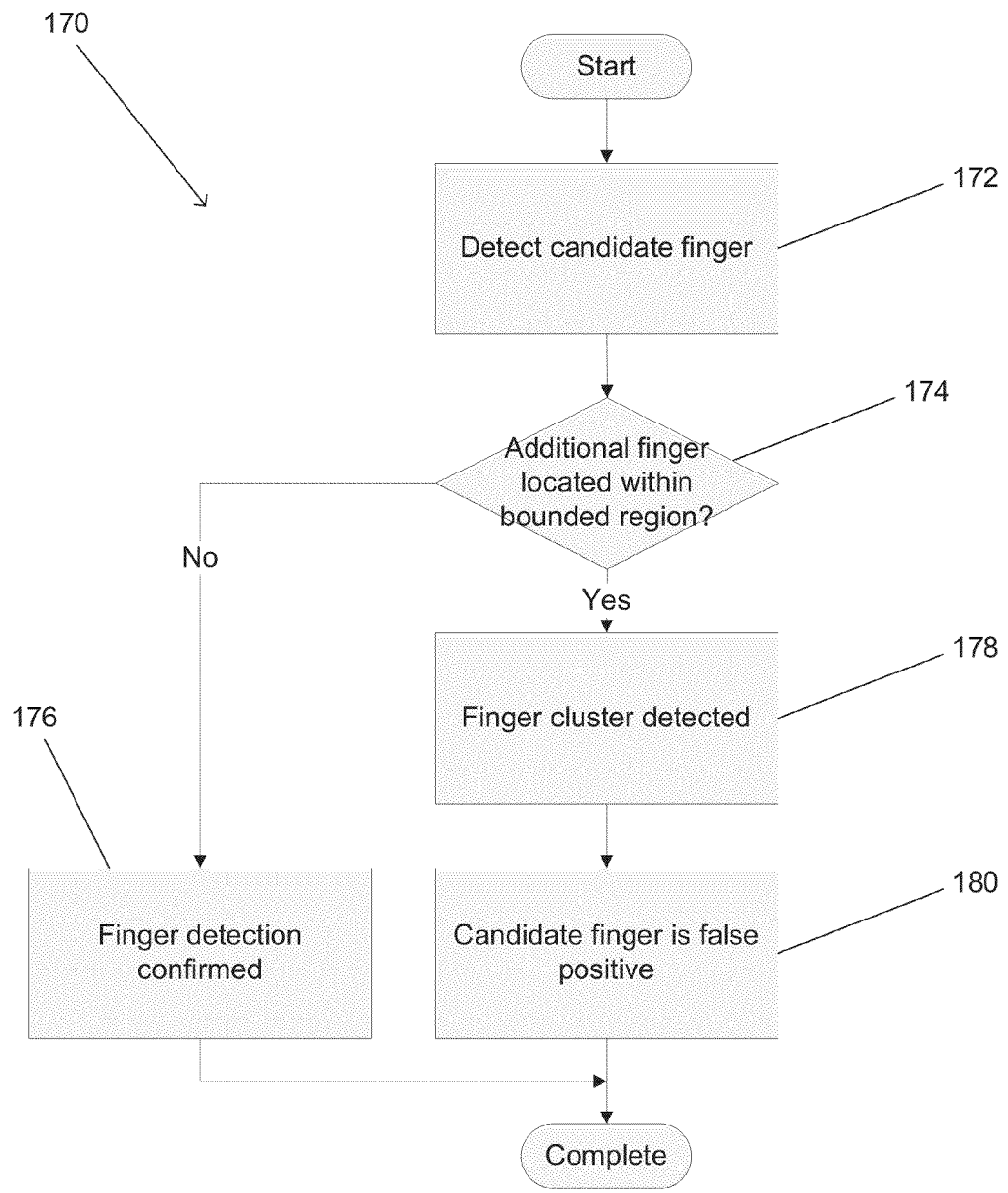
FIG. 8 is a flow chart illustrating a process for determining whether a candidate finger is part of a finger cluster in accordance with an embodiment of the invention.

A process for detecting a pattern of candidate fingers corresponding to a finger cluster in accordance with an embodiment of the invention is illustrated in FIG. 8. The process 170 includes detecting (172) a candidate finger. Once the candidate finger is detected, location of one or more additional candidate fingers within a search space can be used to determine whether the candidate finger is part of a finger cluster that is likely to correspond to a user's knuckles. In several embodiments, the search for a finger cluster is constrained based upon the scale metadata associated with the matching template for the first candidate finger (i.e. metadata indicative of the size of the candidate finger in the image) and the distance of the candidate finger. As discussed below, distance information can be obtained by performing a disparity search within multiple views of the candidate image and/or obtained from a dense depth map of the scene generated by the image processing system and/or by the camera system used to capture the image of the scene. When no additional fingers are detected, then the candidate finger cannot be disregarded on the basis that it is part of a finger cluster and/or finger detection can be confirmed (176). In the event that an additional finger is detected (174), then a determination (178) can be made concerning the nature of the finger. The second finger may indicate that the first finger is part of the knuckles of a hand and should not be considered; or is simply adjacent another finger and should be consider. In many embodiments, a template matching process and/or a classifier can be utilized to differentiate between different types of finger clusters. The conclusion concerning the nature of the finger cluster also can be useful in informing hand pose.

Although specific processes are discussed above with reference to FIG. 8 for performing finger cluster detections, any of a variety of processes can be utilized to detect finger clusters and/or other patterns that may be indicative of false detection by a template matching process as appropriate to the requirements of specific applications can be utilized in accordance with embodiments of the invention. Additional processes for confirming finger detections, including processes involving finding alternate views of candidate fingers in alternate images in accordance with embodiments of the invention are discussed further below.

Confirming Finger Detections Using Alternate Views

In a number of embodiments, the image processing system receives images of a scene captured from multiple viewpoints. A template matching process similar to the processes outlined above can be used to locate one or more candidate fingers in a reference image, and the finger detection can be confirmed by locating an alternate view of the candidate finger in one or more alternate images. The search for alternate views of the candidate finger can be guided by parallax.

Figure 9:
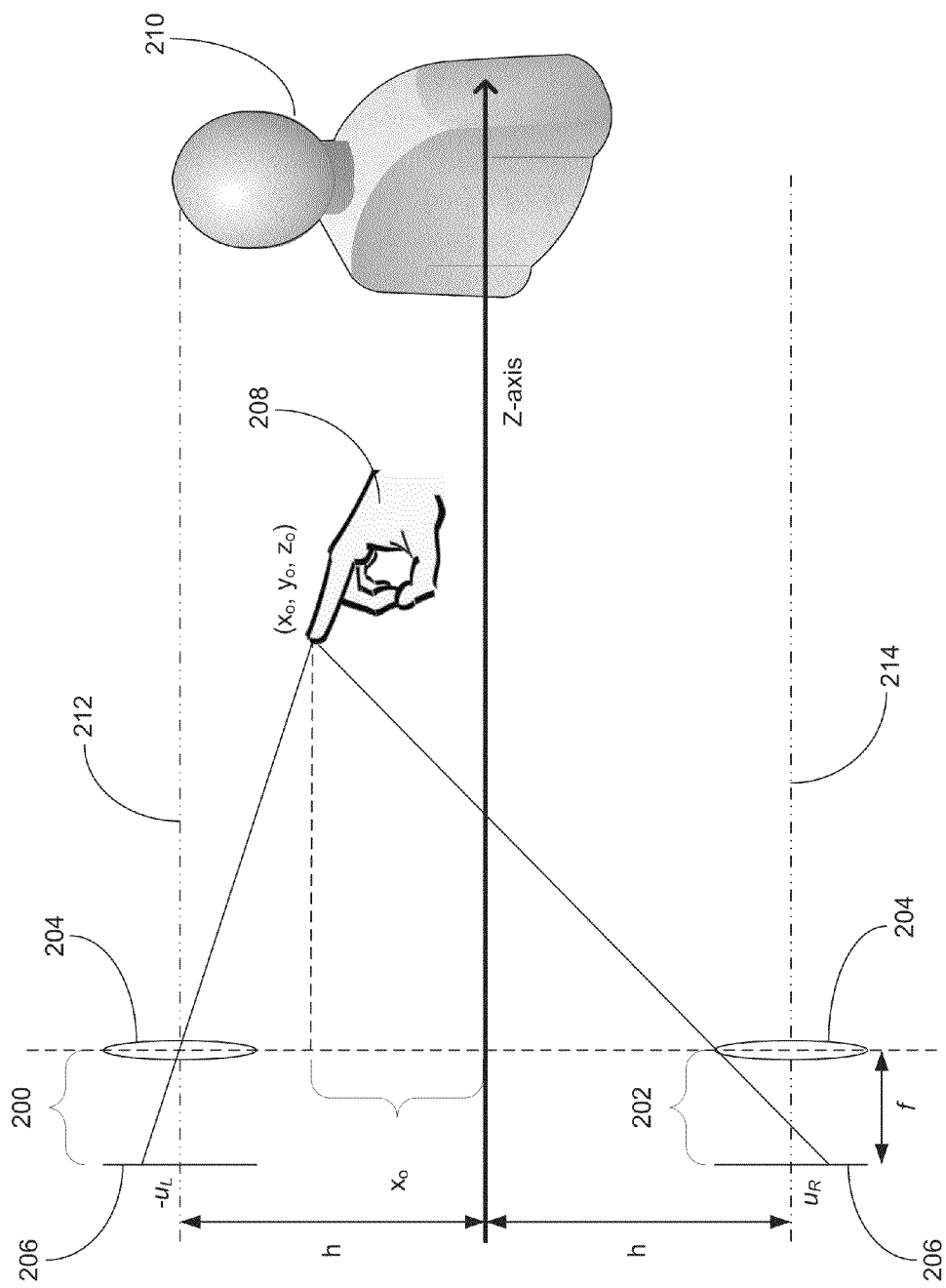
FIG. 9 conceptually illustrates capturing image data using a reference camera and an alternate view camera.
Figures 10A, 10B:
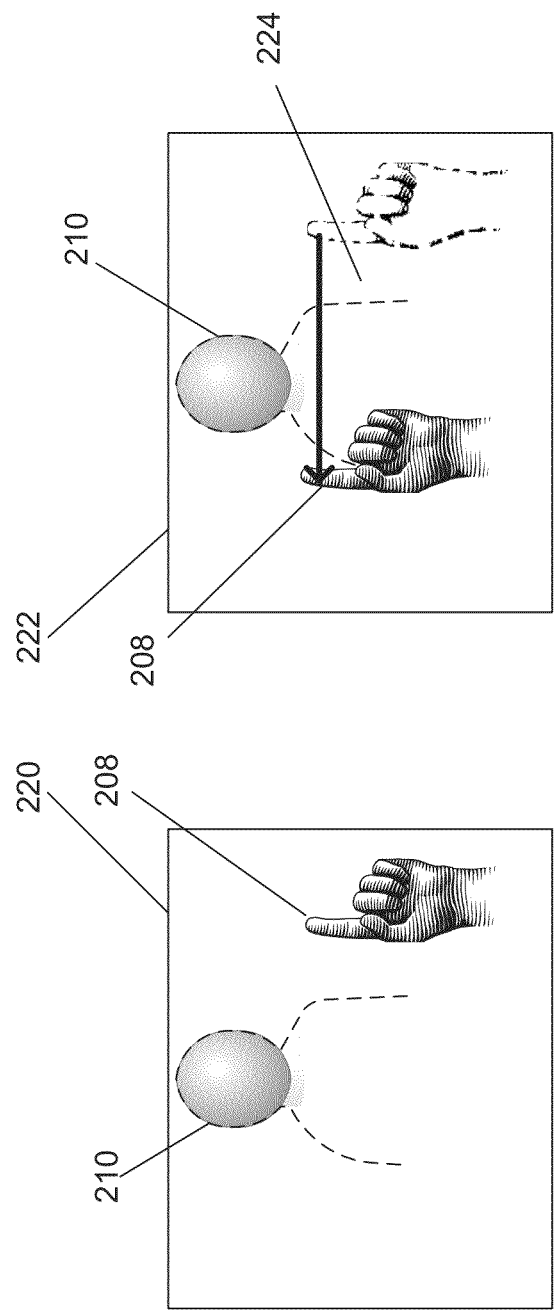
FIGS. 10A and 10B conceptually illustrate the effect of parallax in images of a scene captured by a reference camera and an alternate view camera.

Parallax in a two camera system is illustrated in FIG. 9. The two cameras 200, 202, include a lens stack 204 and a focal plane 206. Each camera has a back focal length f, and the two cameras are separated by the baseline distance of 2 h. The field of view of both cameras encompasses a scene including a foreground object 208 (a finger) and a background object 210 (a torso). The scene from the viewpoint of the first camera 200 is illustrated in FIG. 10A. In the image 300 captured by the first camera, the foreground object 208 appears located slightly to the right of the background object 210. The scene from the viewpoint of the second camera 202 is illustrated in FIG. 10B. In the image 302 captured by the second camera, the foreground object 208 appears shifted to the left hand side of the background object 210. The disparity introduced by the different fields of view of the two cameras 200, 202, is equal to the difference in location of the foreground object 208 between its location in the image captured by the first camera (indicated in the image captured by the second camera by ghost lines 304) and its location in the image captured by the second camera. As is discussed further below, the distance from the two cameras to the foreground object can be obtained by determining the disparity of the foreground object in the two captured images.

Referring again to FIG. 9, the point $(x_o, y_o, z_o)$ on the foreground object will appear on the focal plane of each camera at an offset from the camera's optical axis. The offset of the point on the focal plane of the first camera 200 relative to its optical axis 212 is shown as $-u_L$. The offset of the point on the focal plane of the second camera 202 relative to its optical axis 214 is shown as $u_R$. Using similar triangles, the offset between the images captured by the two cameras can be observed as follows:

$$\frac{h - x_o}{z_o} = \frac{-u_L}{f}$$

$$\frac{h + x_o}{z_o} = \frac{u_R}{f}$$

Combining the two equations yields the disparity (or parallax) between the two cameras as:

$$\Delta_{parallax} = u_R - u_L = \frac{2hf}{z_o}$$

From the above equation, it can be seen that disparity between images captured by the cameras is along a vector in the direction of the baseline of the two cameras, which can be referred to as the epipolar line between the two cameras. Furthermore, the magnitude of the disparity is directly proportional to the baseline separation of the two cameras and the back focal length of the cameras and is inversely proportional to the distance from the camera to an object appearing in the scene.

In several embodiments, video data captured by a reference camera and alternate view cameras can be rectified to simplify the process of locating alternate views of a candidate finger by bounding the search to the epipolar line. Typically, a set of cameras can observe a maximum disparity (i.e. the closest distance at which an object can be resolved in multiple cameras) and a minimum disparity (i.e. the disparity for an object at infinity). When a candidate finger is located in a reference image, a search along the epipolar line from the minimum disparity to the maximum disparity can be used to locate an alternate view of the candidate finger and provide finger detection confirmation. A disparity search can be further bounded based upon a permitted minimum and maximum finger size. Effectively, a limit on the maximum disparity can be defined based upon the resulting detected finger being smaller than fingers observed in the human population. Similarly, a limit on the minimum disparity can be defined based upon the resulting detected finger being larger than fingers observed in the human population.

In many embodiments, the search is performed with respect to pixels within a predetermined margin relative to the epipolar line and with respect to templates that are rotated and scaled a predetermined amount relative to the template matching the candidate finger in a reference frame of video. In several embodiments, projective geometry is used to determine the permitted rotation of a template relative to the template matching the candidate finger in a reference frame. Using projective geometry, the anticipated rotation of a candidate finger visible in a reference frame within an alternate view frame can be determined based upon the baseline between the reference view camera and the alternate view camera, the distance to the candidate finger, and the location of the candidate finger within the reference frame. Accordingly, as a search is performed the extent of the permitted rotation can vary with the disparity (i.e. distance along the epipolar line) between the pixel being considered by the template matching process and the position of the candidate finger in the reference frame of video. In many embodiments, the scale of the template matching the candidate finger in a reference frame of video is used to perform template matching. In a number of embodiments, additional templates corresponding to larger permitted rotations and/or scaling can be searched with increased disparity and/or offset relative to the center of an image captured by a reference camera to reflect the fact that appearance is likely to change dramatically from a reference view to an alternate view the closer a candidate finger is to the reference camera and further the candidate finger is from the center of the field of view of the reference camera. When an alternate view of a candidate finger is located in one or more alternate views, the disparity between the candidate finger in two or more of the different views can be used to determine the distance from the cameras to the detected finger.

Figure 11:
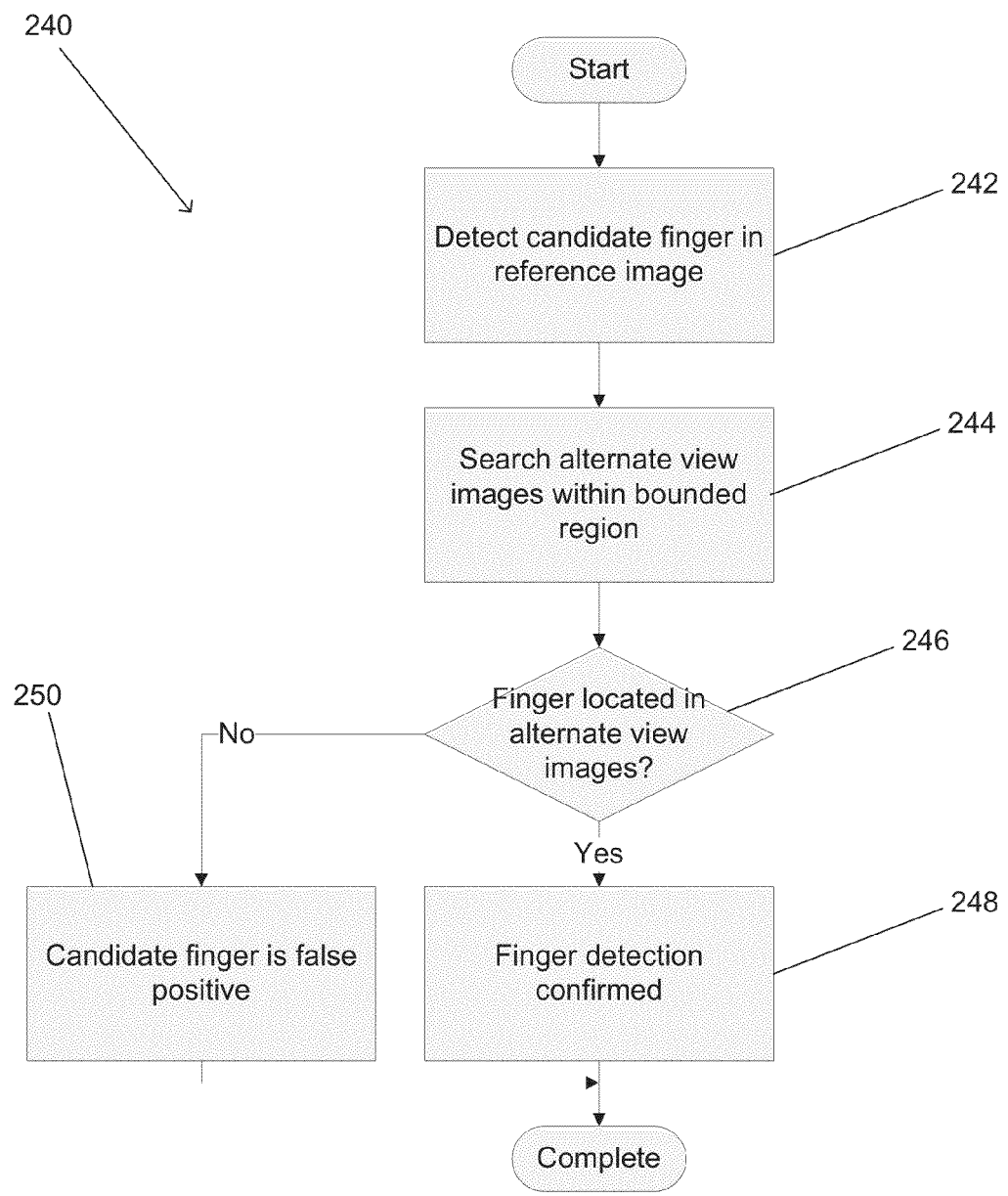
FIG. 11 is a flow chart illustrating a process for confirming finger detection using alternate view images in accordance with an embodiment of the invention.

A process for confirming detection of a candidate finger observed in a reference image using an alternate view image in accordance with an embodiment of the invention is illustrated in FIG. 11. The process 240 includes detecting (242) a candidate finger in a reference image. A search can then be conducted within (244) at least one alternate view image within a bounded region. The search region can be bounded spatially to accommodate uncertainty in the rectification of the two images and the location of the candidate finger within the reference image. The templates that can be utilized during the search can also be bounded based upon permitted rotation and scaling relative to the template that matched the candidate finger in the reference image. Processes for performing bounded searches along an epipolar line for alternate views of a candidate finger located in a reference image in accordance with embodiments of the invention are discussed further below. When the bounded search within the alternate view image(s) identifies (246) a template match, finger detection is confirmed (248) and the distance of the detected finger from the cameras can be determined based upon the disparity between the reference image and the alternate view image, the baseline between the reference camera and the alternate view camera, and the focal length of the cameras. When the bounded search along the epipolar line from the minimum disparity to the maximum disparity does not result in a template match, then the candidate finger is determined (250) to be a false positive.

As discussed above, the alternate view image can be rectified with respect to the reference image and a search conducted within a bounded region surrounding the epipolar line between the cameras. In several embodiments, a search is conducted with respect to pixels a predetermined distance from the epipolar line. In several embodiments, a search is conducted with respect to pixels a predetermined Manhattan distance from the epipolar line. The search can also be bounded with respect to the template. In several embodiments, the image processing system maintains metadata describing the scale and rotation of the template that matched the candidate finger in the reference image. In a number of embodiments, the search for an alternate view of the candidate finger along the epipolar line can involve performing template matching using a process similar to any of the processes outlined above but restricting the templates searched to templates that have a predetermined scale and rotation relative to the template that matched the candidate finger in the reference image. In several embodiments, the templates that are used when performing template matching can change with increased disparity to account for the increased change in orientation and scaling that may be observed in different views of an object as the object moves closer to the cameras.

Figure 12:
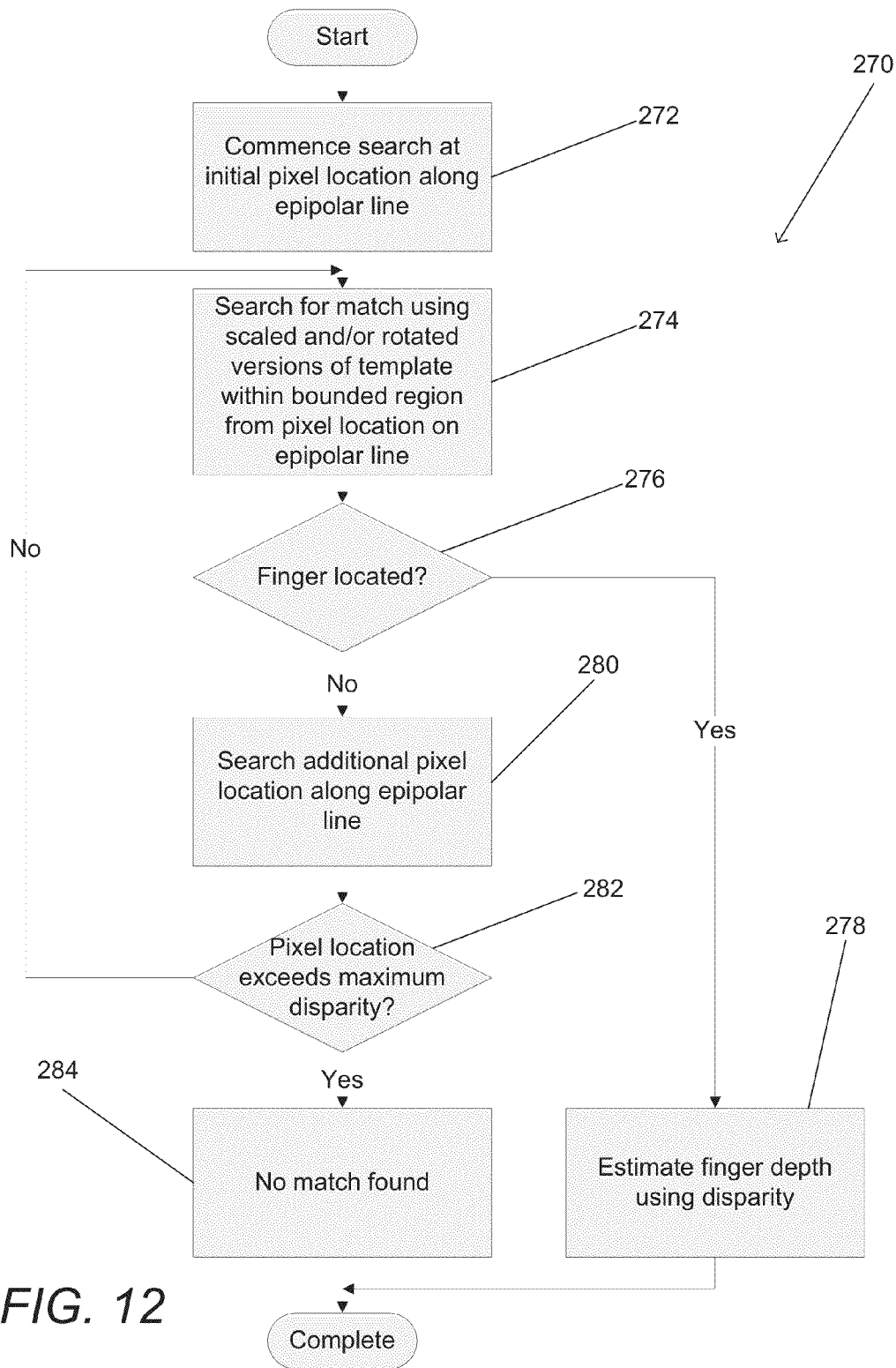
FIG. 12 is a flow chart illustrating a process for searching along an epipolar line within an alternate view image for a finger matching a template used to identify a candidate finger in a reference image in accordance with an embodiment of the invention.

A process for performing a bounded search for an alternate view of a candidate finger located using a template in a reference image by searching along an epipolar line in an alternate view image in accordance with an embodiment of the invention is illustrated in FIG. 12. The process 270 includes determining (272) an initial pixel location along the epipolar line at which to commence a search. The initial pixel location can be determined based upon the requirements of a specific application. Although the minimum disparity and maximum disparity are likely known, a candidate finger is likely to be a foreground object a minimum distance from the cameras. Accordingly, a disparity search can be conducted starting at the most likely distance and searching depths closer to and further from the initial distance. In several embodiments, the starting pixel is identified based upon a disparity corresponding to a previous depth estimate obtained while tracking a finger. In other embodiments, any of a variety of techniques can be utilized to rapidly search the epipolar line to locate an alternate view of a candidate image.

As described above, a bounded search can be performed (274) within a predetermined distance of the point along the epipolar line using a set of templates limited by rotation and scaling bounds relative to the template that matched the candidate finger in the reference image. In several embodiments, the bounds placed on rotation and/or scaling can be determined based upon disparity. The spatial, rotation, and scaling bounds are largely a function of the requirements of a specific application. If a template match is located (276), then the disparity can be used to estimate (278) the depth of a finger. If no template match is found, then the process 270 continues to iterate by selecting (280) additional pixel locations along the epipolar line and performing bounded searches (274) until the search is exhausted (282). In which case, the process 270 determines that the alternate view image does not contain an alternate view of the candidate finger suggesting that the candidate finger detected in the reference image is a false positive.

In many embodiments, the disparity search is performed with pixel precision. In several embodiments, additional depth estimation precision is desirable and the disparity search can be performed with sub-pixel precision by resampling the alternate view image to the appropriate sub-pixel position along the epipolar line.

In many embodiments, a dense depth map is available to the image processing system. The dense depth map can be utilized to determine the depth of a candidate finger and the anticipated disparity between the location of the candidate finger in a reference image and the location of the candidate finger in the alternate view image. The disparity can also inform the anticipated scaling and/or rotation of a template that would match an alternate view of the candidate finger based upon the template that matched the candidate finger in the reference view. In several embodiments, the template matching process described above is performed using template matching with respect to a dense depth map of the scene instead of or in addition to template matching with respect to an image of the scene. The dense depth map includes data similar to that of an image having a single color channel. Therefore, the gradient orientations of the dense depth map can be processed in a similar manner to the image gradient orientations of a monochrome image. A finger (or other object such as a different hand part) in the depth map will typically have the same gradient orientations as the gradient orientations within a monochrome or color image. Therefore, candidate fingers can be identified within a dense depth map of a scene using the same processes outlined above to match a set of templates against the image gradient orientations in a monochrome or color image of the scene.

Figure 13:
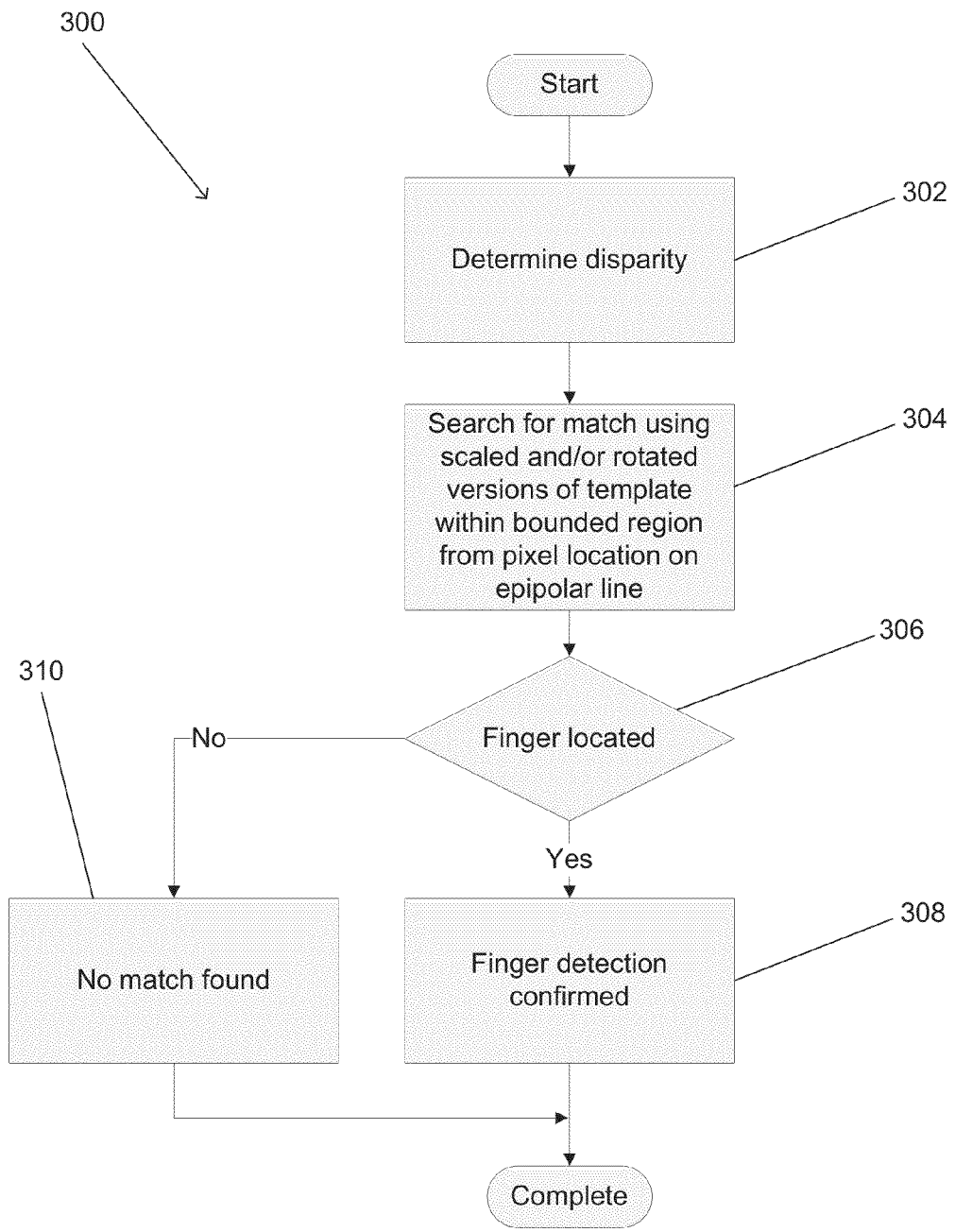
FIG. 13 is a flow chart illustrating a process for searching along an epipolar line within an alternate view image for a finger matching a template used to identify a candidate finger in a reference image based upon the depth of the candidate finger in the reference image in accordance with an embodiment of the invention.

A process for performing a bounded search of an alternate view image for an alternate view of a candidate finger identified using a template in a reference image based upon the depth of the candidate finger in accordance with an embodiment of the invention is illustrated in FIG. 13. The process 300 involves determining (302) the anticipated disparity between the location of the candidate finger in the reference image and the location of an alternate view of the candidate finger in an alternate view image. The anticipated disparity identifies a pixel location along the epipolar line and a bounded search can be performed within the region surrounding the pixel location to locate an alternate view of the candidate finger. As discussed above, the bounded search can involve searching pixel locations within a predetermined distance of the pixel location on the epipolar line and/or using a subset of templates corresponding to bounded rotations and scalings relative to the template that matched the candidate finger in the reference image. When a finger is located (306), the finger detection in the reference image is confirmed (308). Otherwise, no match is found and the candidate finger is likely a false positive.

Although specific processes for searching for an alternate view of a candidate finger in one or more alternate view images are described above with respect to FIGS. 11-13, any of a variety of processes can be utilized to locate alternate views of candidate fingers in alternate view images in accordance with embodiments of the invention. For example, much of the discussion above is in the context of searching epipolar lines within rectified images. In many embodiments, the images are not rectified and the image processing system simply uses calibration information to identify specific pixels that lie in regions surrounding epipolar lines as the bounded search is performed. In this way, the computational load associated with rectifying the entire alternate view image can be reduced by only performing rectification with respect to specific pixels of interest when performing template matching. Furthermore, while the discussion above describes determining distance to a detected finger using disparity and/or dense depth maps, image processing systems in accordance with many embodiments of the invention determine depth using a single view of a detected finger. Processes for estimating depth of detected fingers using a single image in accordance with embodiments of the invention are discussed further below.

Determining Depth Using a Single View

Templates used to perform template matching can be determined by scaling and rotating a single template. The size that an object will appear within an image captured by a camera is largely dependent upon the distance of the object form the camera and the focal length of the camera. When the size of the object is known, the relative size of the object in an image captured by a camera can be utilized to determine the distance to the object. In many embodiments, a finger is initially registered with the image processing system to determine the size of the finger at a known distance. The scale of the template that matches the finger during the registration process can be used to indicate the size of the finger. As the finger is tracked, the relative scale of the template that matches the finger provides information concerning the distance of the finger from the camera. In the context of a laptop computer, registration can involve placing a finger flat on specific keys on the keyboard or with a specific finger or part of the user's hand touching a specific feature of the laptop computer. Similar techniques can be utilized to perform initial registration of the size of a finger in other types of image processing system. Indeed, any process that can be used to enable a user to provide an initial registration of the size of user's finger such as (but not limited to) by placing the finger on a touchscreen display or on a touch pad can be utilized as appropriate to the requirements of a specific application in accordance with embodiments of the invention.

Figure 14:
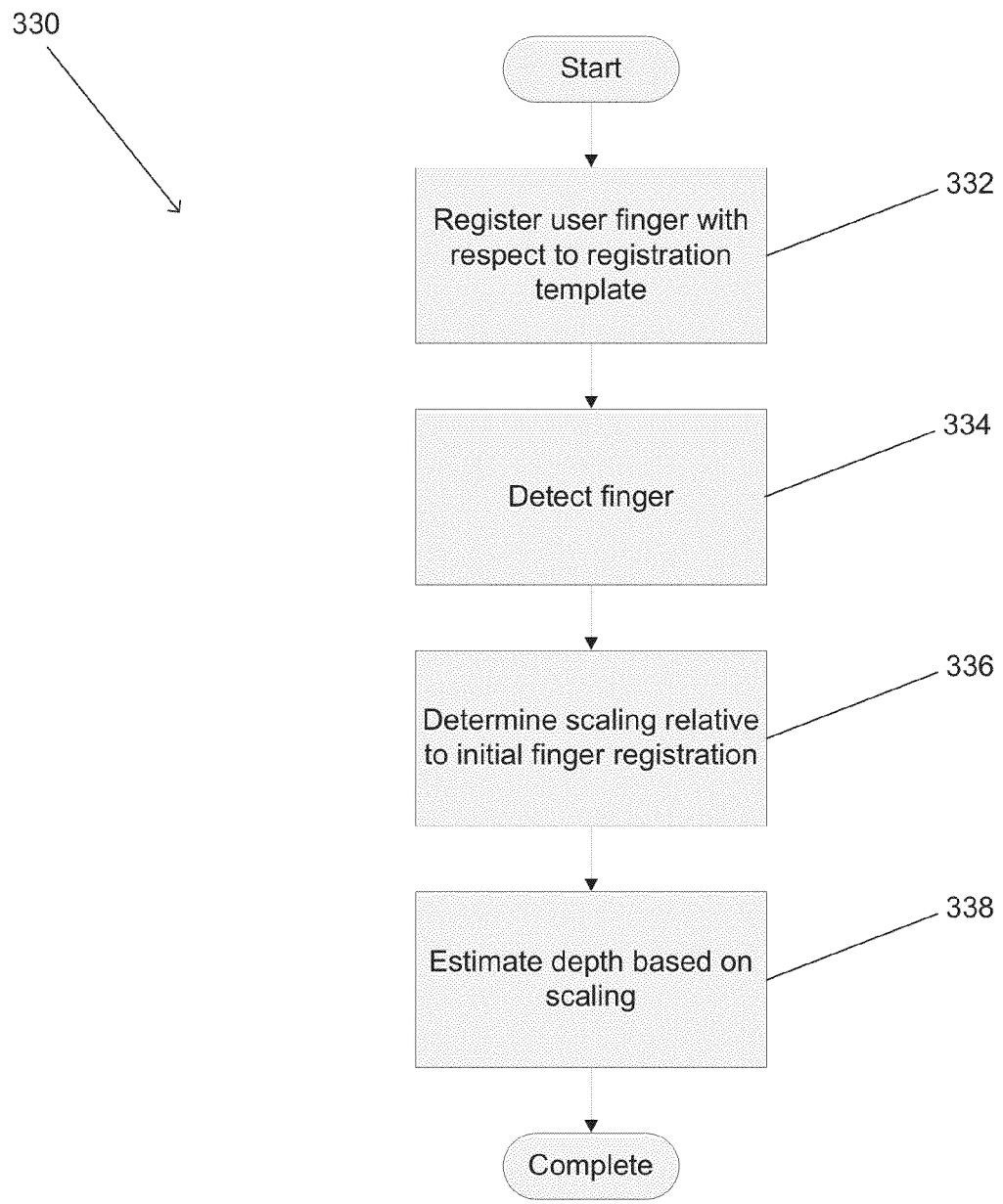
FIG. 14 is a flow chart of a process for estimating depth using a single camera based upon scaling of a detected finger relative to an initial finger size registration in accordance with an embodiment of the invention.

A process for determining depth based upon the relative scaling of templates used to detect a finger during a registration process and during a finger tracking process in accordance with an embodiment of the invention is illustrated in FIG. 14. The process 330 includes registering a user finger with respect to a registration template at a known distance from the camera. In other embodiments, the registration template can be determined using other means, such as (but not limited to) detecting the shape of the finger using a touchscreen display, a touchpad user input device, and/or other high resolution touch-based user input device. Metadata describing the scaling of the registration template can provide the size of the registration template. A finger detection process is then performed (334) in which the user's finger is detected at an unknown distance from the camera within an image of the scene using a template matching process similar to the processes described above. The relative scaling of the template used to detect the finger and the registration template can be determined (338) using metadata associated with the templates and/or a direct comparison of the templates. Based upon the relative scaling of the template used to detect the finger and the registration template, a depth estimate for the detected finger can be determined (338).

Although specific processes for determining depth based upon a single view of a detected finger are described above with reference to FIG. 14, any of a variety of processes can be utilized to determine depth from a single view of a detected finger based upon the known size and/or shape of the detected finger as appropriate to the requirements of specific applications in accordance with embodiments of the invention.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed:

1. A system for detecting hand posture using parts based template matching to detect individual human fingers, comprising:
    a processor;
    a reference camera configured to capture sequences of frames of video data, where each frame of video data comprises color information for a plurality of pixels;
    memory containing:
        a hand tracking application; and
        a plurality of edge feature templates wherein each of the plurality of edge feature templates is a rotated and scaled version of a finger template;
    wherein the hand tracking application configures the processor to:
        obtain a frame of video data from the reference camera;
        detect at least one candidate finger in the frame of video data received from the reference camera, where each of the at least one candidate finger is a grouping of pixels identified by searching the frame of video data (I) for a grouping of pixels that have image gradient orientations that match a given edge feature template ($\mathcal{T}$) from the plurality of edge feature templates by determining whether the similarity of a number of gradient orientations extracted from the given edge feature template at a list P of locations r to be considered from edge features ($\mathcal{O}$) in the given edge feature template and image gradient orientations extracted from the frame of video data relative to a pixel location c exceed a predetermined matching threshold using the following similarity measure:

$$\varepsilon(I, T, c) = \sum_{r \in P} \left( \max_{t \in R(c+r)} |\cos(ori(O, r) - ori(I, t))| \right)$$

$$\text{where } R(c+r) = \left[ c + r - \frac{T}{2}, c + r + \frac{T}{2} \right] \times \left[ c + r - \frac{T}{2}, c + r + \frac{T}{2} \right]$$

defines a predetermined neighborhood of size T centered on the pixel location c+r within the frame of video data; and
        verify the correct detection of a candidate finger by confirming that the colors of the pixels within the grouping of pixels identified as a candidate finger satisfy a skin color criterion.

2. The system of claim 1, wherein the edge features of the finger template are synthetically generated.

3. The system of claim 1, wherein the plurality of edge feature templates are stored in a data structure that includes metadata describing the rotation and scaling applied to the finger template to obtain a given edge feature template within the data structure.

4. The system of claim 1, wherein the edge feature template is a binary edge map.

5. The system of claim 1, wherein the edge feature template is a map of image gradient orientations.

6. The system of claim 1, wherein the hand tracking application configures the processor to search the frame of video data for a grouping of pixels that have image gradient orientations that match a given edge feature template from the plurality of edge feature templates by:
    selecting a grouping of pixels;

searching within a predetermined neighborhood of pixels relative to each edge feature in the given edge feature template to find the image gradient orientation that is most similar to the image gradient orientation of the edge feature; and determining the similarity of the grouping of pixels to the given edge feature template based upon a measure of the similarity of the most similar image gradient orientations found within the grouping of pixels for each of the edge features in the given edge feature template.

7. The system of claim 6, wherein the hand tracking application configures the processor to determine image gradient orientation based upon a change in intensity of neighboring pixels in the video data.

8. The system of claim 6, wherein the hand tracking application configures the processor to determine image gradient orientation based upon a change in the color of neighboring pixels in the video data in at least one color channel.

9. The system of claim 8, wherein the video data comprises color information for a plurality of pixels in blue, green and red color channels.

10. The system of claim 9, wherein the hand tracking application configures the processor to determine image gradient orientation by computing the orientation of gradients in red and green color channels separately and using the gradient orientation of the channel whose magnitude is the largest.

11. The system of claim 9, wherein the hand tracking application configures the processor to determine image gradient orientation by computing the orientation of gradients in blue, green, and red color channels separately and using the gradient orientation of the channel whose magnitude is the largest.

12. The system of claim 1, wherein the hand tracking application configures the processor to quantize the image gradient orientations into a predetermined number ($n_0$) of values that can each be represented by a single bit.

13. The system of claim 12, wherein the hand tracking application configures the processor to calculate the similarity measure by spreading the quantized image gradient orientation at pixel location t (ori(I, t)) in a T×T window around the pixel location t and encoding the spread image gradient orientations using a binary string of length $n_0$, where each bit in the string corresponds to each quantized image gradient orientation present in the T×T window.

14. The system of claim 13, wherein the hand tracking application configures the processor to:
precompute lookup tables of $\max_{t \in R(C+r)}|\cos(\text{ori}(\mathcal{O},r)-\text{ori}(I,t))|$ for each possible orientation $\text{ori}(\mathcal{O},r)$ of an edge feature at a given pixel location t in the video data; and
evaluate the similarity measure for the given edge feature template using the precomputed lookup tables.

15. The system of claim 1, wherein the hand tracking application determines the pixel locations (c) searched within the frame of video data using information including the pixel location of a previously identified finger.

16. The system of claim 15, wherein the hand tracking application determines the pixel locations (c) searched using information further comprising the velocity of a previously identified finger.

17. The system in claim 1, where the hand tracking application configures the processor to:
detect the presence and initial location of at least one finger by recognizing an initialization gesture; and
determine the pixel locations (c) searched within the frame of video data using information including the initial location of the at least one finger.

18. The system of claim 1, wherein:
the memory contains video data of a previous frame; and
the hand tracking application configures the processor to determine the pixel locations (c) searched within the frame of video data using information including pixels in the frame of video data that have changed relative to the pixels in the video data of the previous frame.

19. The system of claim 1, wherein:
the finger template further comprises a plurality of surface color pixel sample locations defined relative to the edge features template; and
the hand tracking application configures the processor to confirm that the colors of the pixels within the grouping of pixels identified as a candidate finger satisfy a skin color criterion by confirming that the colors of the surface color pixel sample locations for the edge feature template from the plurality of edge feature templates that matches the grouping of pixels identified as a candidate finger satisfy a skin color criterion.

20. The system of claim 19, wherein the skin color criterion is a number of pixel sample locations having a color corresponding to a predetermined range of colors.

21. The system of claim 19, wherein the skin color criterion is a ratio of pixel sample locations having a color corresponding to a predetermined range of colors relative to the overall number of pixel sample locations.

22. The system of claim 21, wherein the hand tracking application is configured to adapt the skin color criterion based upon at least one characteristic of the given edge feature template selected from the group consisting of the scale, and rotation of the given edge feature template relative to the finger template.

23. The system of claim 1, wherein the hand tracking application further configures the processor to determine the position, rotation, and size of the at least one detected finger and to determine a hand pose from the location, orientation, and size of the at least one detected finger.

24. The system of claim 23, wherein the hand tracking application further configures the processor to verify the correct detection of a candidate finger by confirming that the detected finger belongs to a possible hand pose indicative of a correct identification of a finger.

25. The system of claim 23, wherein the hand tracking application configures the processor to determine a hand pose using a 3D model of a human hand based upon the location and orientation of the at least one detected finger.

26. The system of claim 23, wherein the hand tracking application configures the processor to determine a hand pose using priors concerning relative size of fingers and thumbs of a human hand based upon the location, orientation and size of the at least one detected finger.

27. The system of claim 23, wherein the hand tracking application configures the processor to determine a hand pose using priors concerning the manner in which finger joints enable manipulation of fingers relative to the pose of a human hand based upon the location, orientation and size of the at least one detected finger.

28. The system of claim 1, further comprising:
a display interface configured to drive a display device;
wherein the hand tracking application configures the processor to:
determine a distance and orientation of a detected finger;
map the determined distance and orientation of the detected finger to a location on the display device; and
generate a target on the display device at the mapped location using the display interface.

29. The system of claim 28, wherein the hand tracking application configures the processor to:
  determine the size of a tracked finger at a known distance from at least one initial frame of video data obtained from the reference camera during a registration process based upon the scaling of an edge feature template from the plurality of edge feature templates that matches the tracked finger; and
  determine the distance to a detected finger in the frame of video data obtained from the reference camera based upon the relative scale of the edge feature template from the plurality of edge feature templates that matches the grouping of pixels corresponding to the detected finger to the scaling of the edge feature template from the plurality of edge feature templates that matched the tracked finger during the registration process.

30. The system of claim 28, further comprising:
  a depth sensor;
  wherein the hand tracking application configures the processor to:
    obtain a depth map from the depth sensor; and
    determine a distance to the detected finger using the depth map.

31. The system of claim 28, further comprising:
  an alternate view camera configured to capture sequences of frames of video data, where each frame of video data comprises color information for a plurality of pixels;
  wherein the hand tracking application configures the processor to:
    obtain a frame of video data from the alternate view camera; and
    determine a distance to the detected finger using disparity between the location of the detected finger in the frame of video data obtained from the reference camera and the frame of video data obtained from the alternate view camera.

32. The system of claim 1, wherein the hand tracking application configures the processor to:
  obtain a sequence of frames of video data from the reference camera; and
  determine hand pose based upon the trajectory in the sequence of frames of video data of at least one detected finger.

33. The system of claim 32, wherein the hand tracking application configures the processor to:
  identify at least one detected finger forming a static gesture; and
  execute a command in response to the identification of the static gesture.

34. The system of claim 32, wherein the hand tracking application configures the processor to:
  identify a trajectory in the sequence of frames of video data of at least one detected finger forming a dynamic gesture; and
  execute a command in response to the identification of the dynamic gesture.

35. A system for detecting hand posture using parts based template matching to detect individual human fingers, comprising:
  a processor;
  a reference camera configured to capture sequences of frames of video data, where each frame of video data comprises color information for a plurality of pixels;
  a display interface configured to drive a display device;
  memory containing:
    a hand tracking application; and
    a plurality of edge feature templates that are rotated and scaled versions of a finger template, which comprises:
      an edge features template; and
      a plurality of surface color pixel sample locations defined relative to the edge features template;
  wherein the hand tracking application configures the processor to:
    obtain a frame of video data from the reference camera;
    detect at least one candidate finger in the frame of video data received from the reference camera, where:
      each of the at least one candidate finger is a grouping of pixels identified by searching the frame of video data for a grouping of pixels that have image gradient orientations that match one of the plurality of edge feature templates; and
      searching the frame of video data for a grouping of pixels that have image gradient orientations that match a given edge feature template ($\mathcal{T}$) from the plurality of edge feature templates comprises:
        selecting a grouping of pixels;
        searching within a predetermined neighborhood of pixels relative to each edge feature in the given edge feature template to find the image gradient orientation that is most similar to the image gradient orientation of the edge feature; and
        determining whether the similarity of a number of gradient orientations extracted from the given edge feature template at a list P of locations r to be considered from edge features ($\mathcal{O}$) in the given edge feature template and image gradient orientations extracted from the frame of video data relative to a pixel location c exceed a predetermined matching threshold using the following similarity measure:

$$\varepsilon(I, T, c) = \sum_{r \in P} \left( \max_{t \in R(c+r)} |\cos(ori(O, r) - ori(I, t))| \right)$$

$$\text{where } R(c + r) = \left[ c + r - \frac{T}{2}, c + r + \frac{T}{2} \right] \times \left[ c + r - \frac{T}{2}, c + r + \frac{T}{2} \right]$$

defines a predetermined neighborhood of size T centered on the pixel location c +r within the frame of video data; and
    verify the correct detection of a candidate finger by confirming that the colors of the surface color pixel sample locations for the edge feature template from the plurality of edge feature templates that matches the grouping of pixels identified as a candidate finger satisfy a skin color criterion;
    determine a distance and orientation of a detected finger;
    map the determined distance and orientation of the detected finger to a location on the display device; and
    generate a target on the display device at the mapped location using the display interface.

36. A method of detecting hand posture by performing parts based template matching to detect individual human fingers, comprising:
  capturing a frame of video data using a reference camera, where the frame of video data comprises color information for a plurality of pixels;
  detecting at least one candidate finger in the frame of video data received from the reference camera using a processor configured using a hand tracking application, where each of the at least one candidate finger is a grouping of pixels identified by searching the frame of video data (I) for a grouping of pixels that have image gradient orientations that match a given edge feature template ($\mathcal{T}$) from a plurality of edge feature templates by determining whether the similarity of a number of gradient orientations extracted from the given edge feature template at a list P of locations r to be considered from edge features ($\mathcal{O}$) in the given edge feature template and image gradient orientations extracted from the frame of video data relative to a pixel location c exceed a predetermined matching threshold using the following similarity measure:

$$\varepsilon(I, T, c) = \sum_{r \in P} \left( \max_{t \in R(c+r)} |\cos(ori(O, r) - ori(I, t))| \right)$$

where $R(c+r) = \left[ c + r - \frac{T}{2}, c + r + \frac{T}{2} \right] \times \left[ c + r - \frac{T}{2}, c + r + \frac{T}{2} \right]$ defines a predetermined neighborhood of size T centered on the pixel location c+r within the frame of video data; and verifying the correct detection of a candidate finger by using a processor configured by a hand tracking application to confirm that the colors of the pixels within the grouping of pixels identified as a candidate finger satisfy a skin color criterion.

* * * * *